Jan. 7, 1930.　　　W. S. GUBELMANN　　　1,742,521
ADDING AND RECORDING MACHINE
Original Filed Jan. 10, 1900　　11 Sheets-Sheet 1

William S. Gubelmann
Inventor.

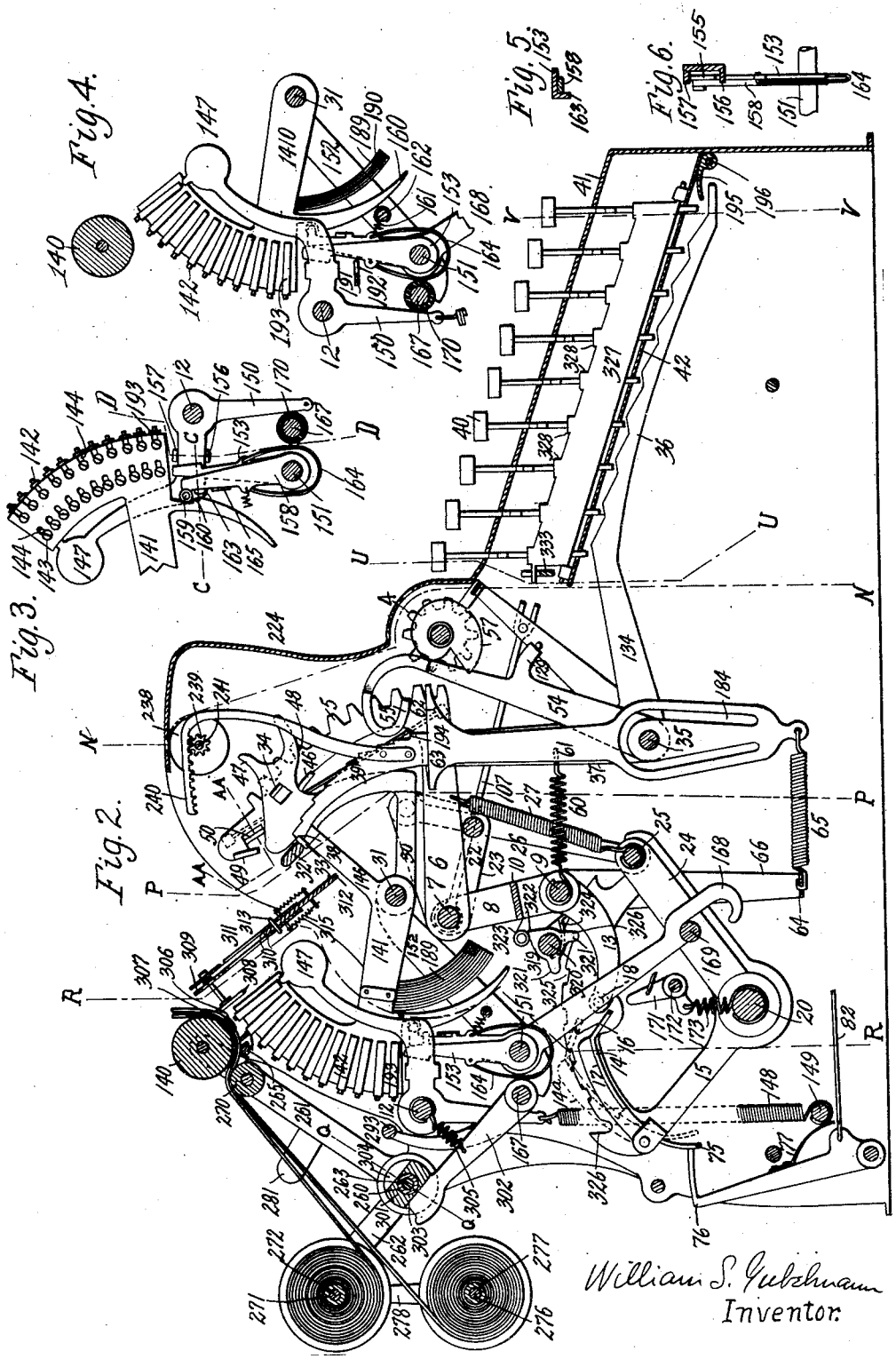

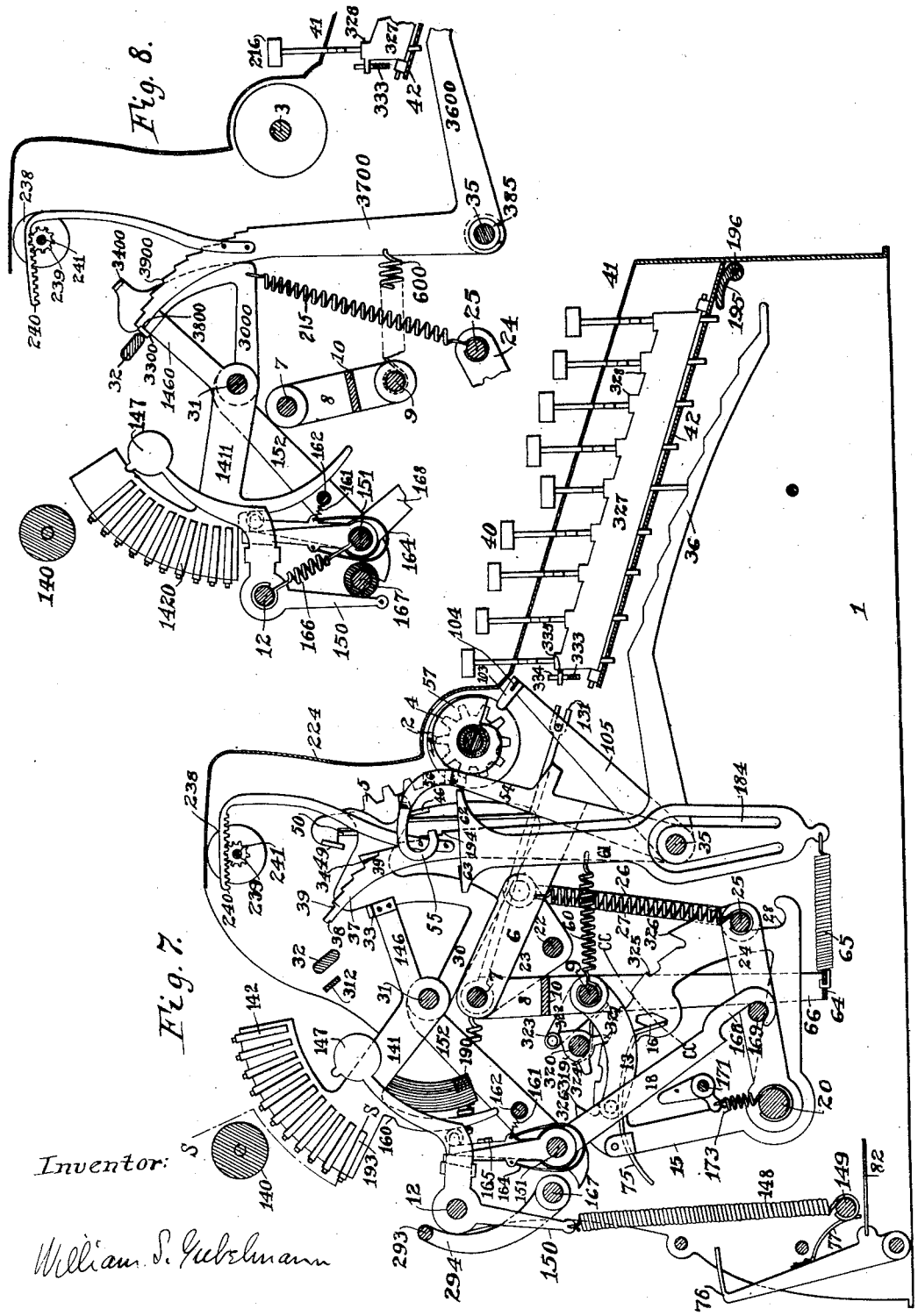

Jan. 7, 1930.      W. S. GUBELMANN      1,742,521
ADDING AND RECORDING MACHINE
Original Filed Jan. 10, 1900    11 Sheets-Sheet 4
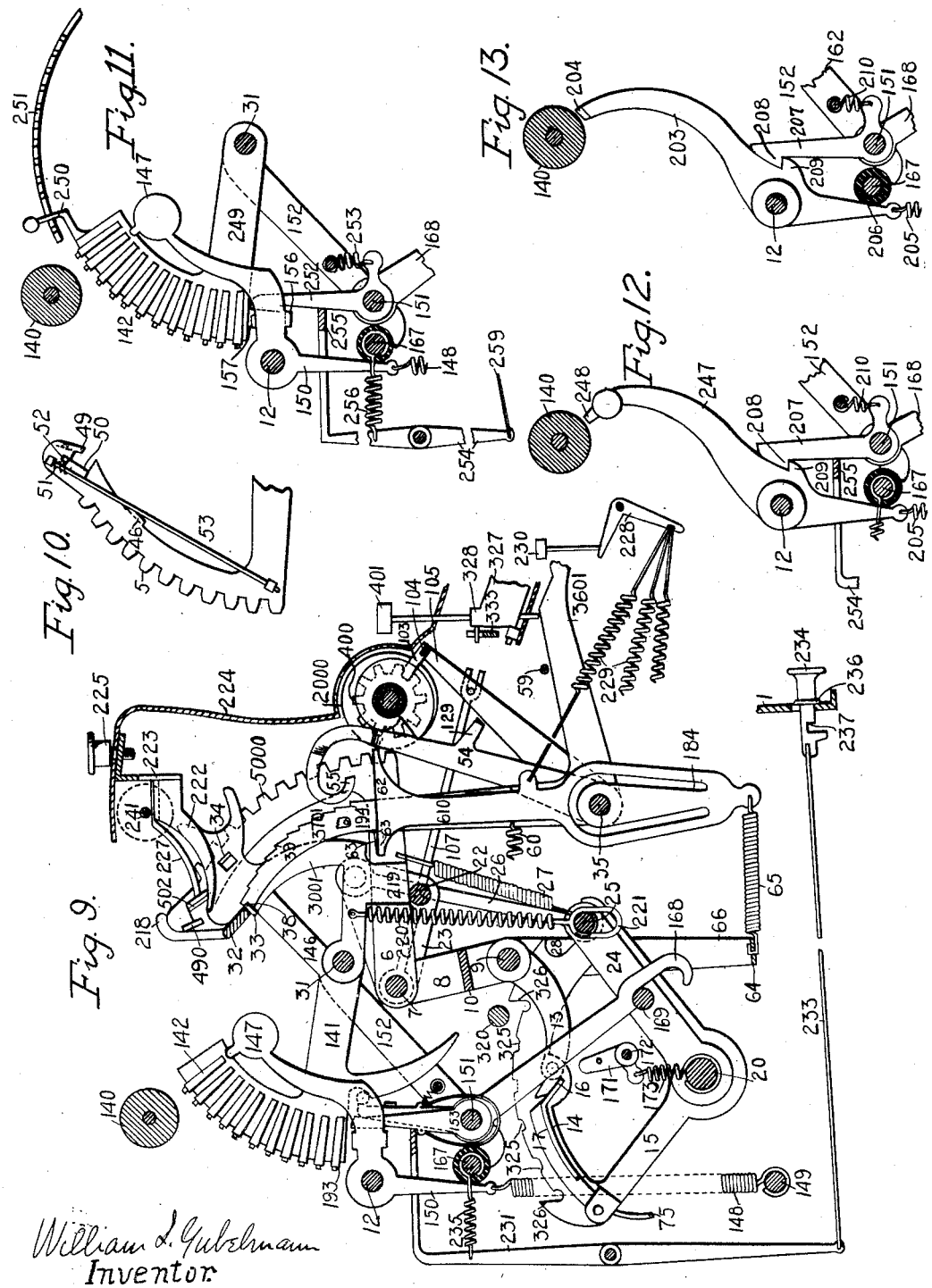
William S. Gubelmann
Inventor Jan. 7, 1930.  W. S. GUBELMANN  1,742,521
ADDING AND RECORDING MACHINE
Original Filed Jan. 10, 1900    11 Sheets-Sheet 5
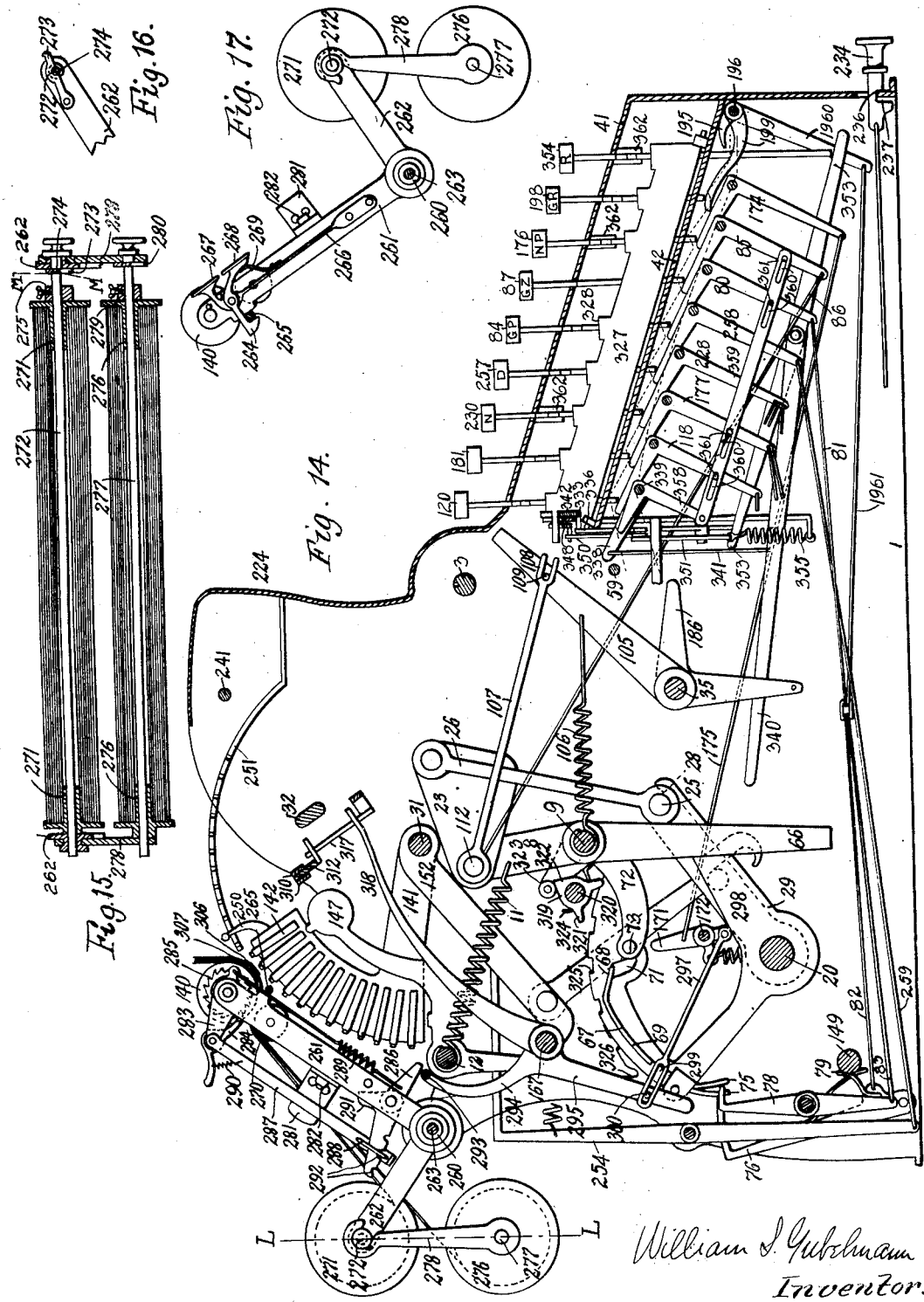
William S. Gubelmann
Inventor.

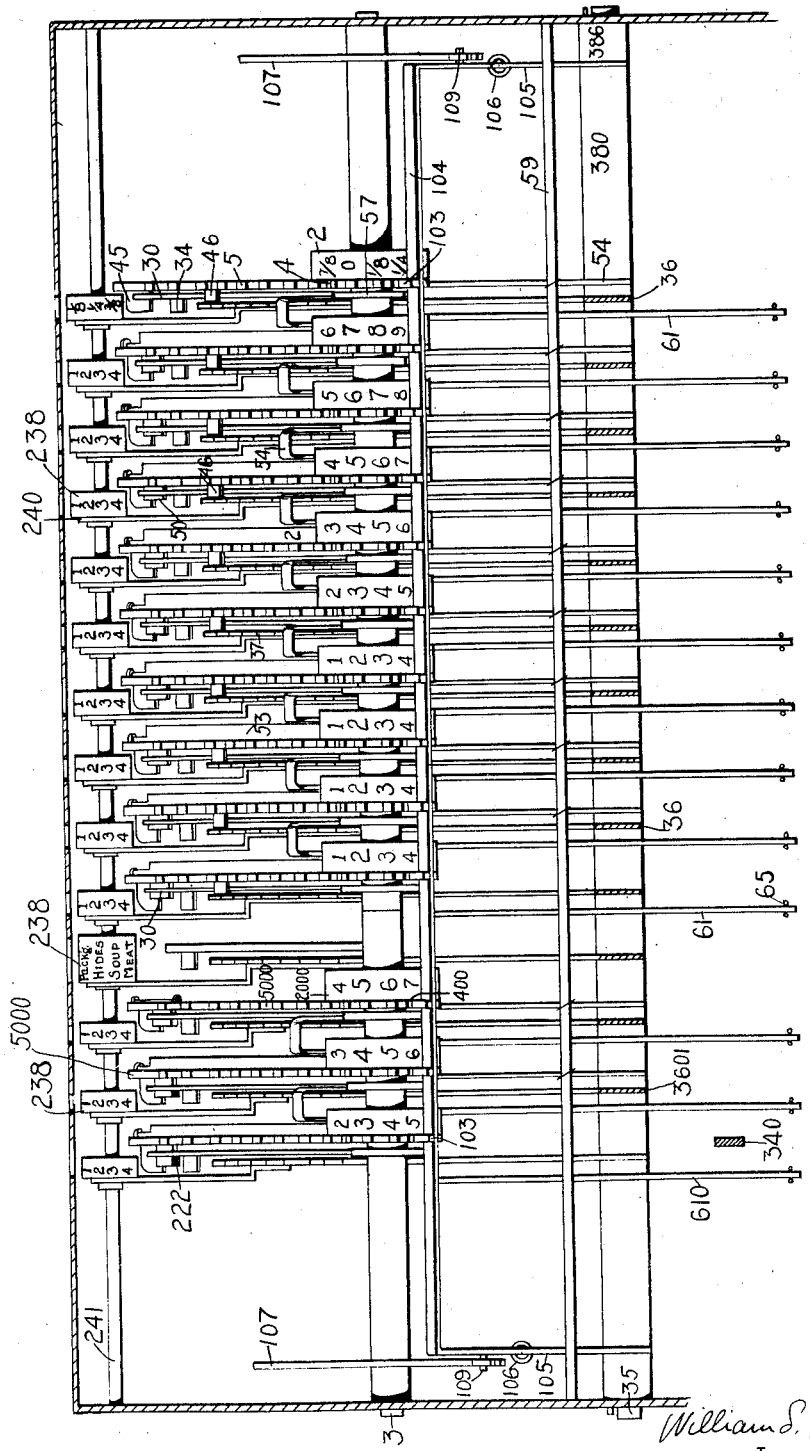

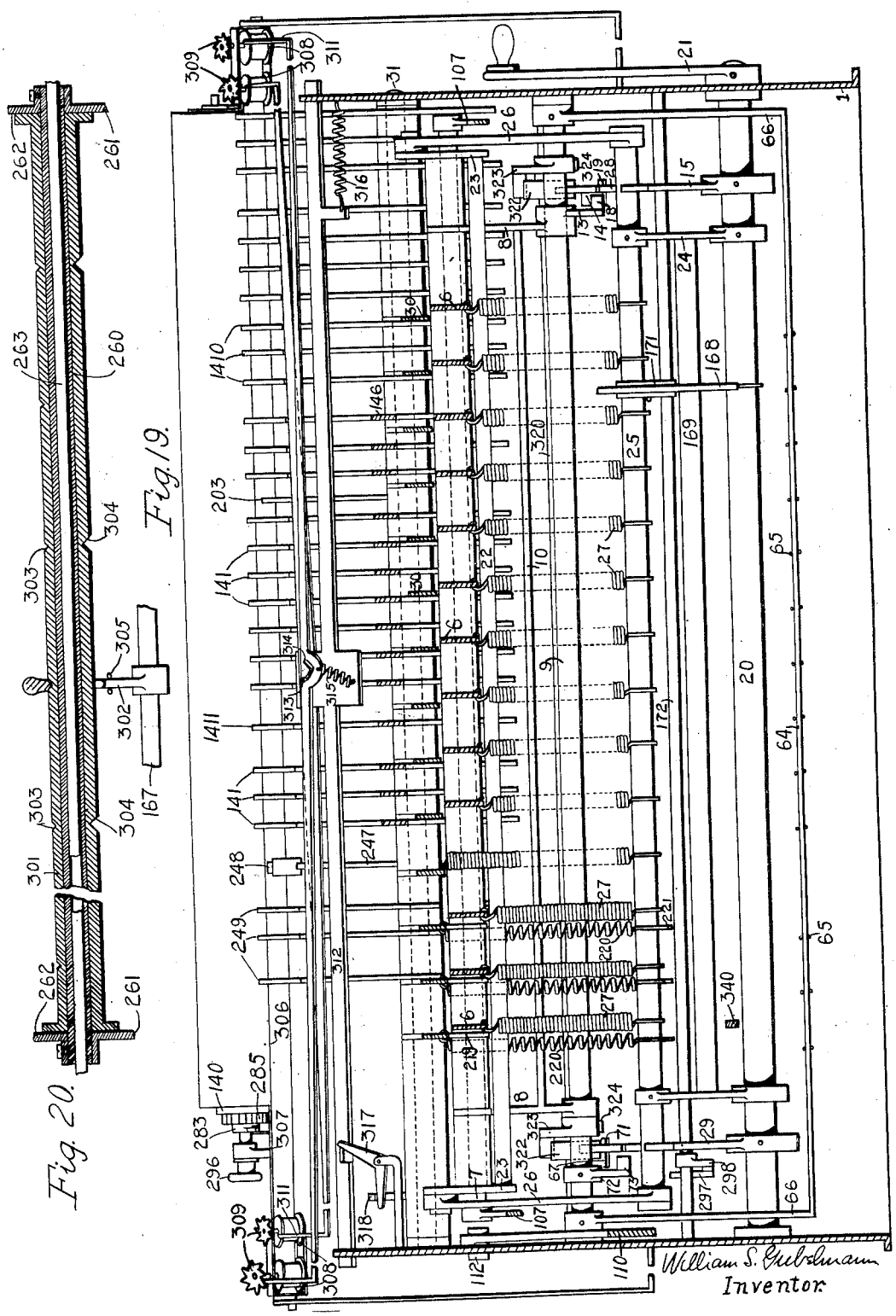

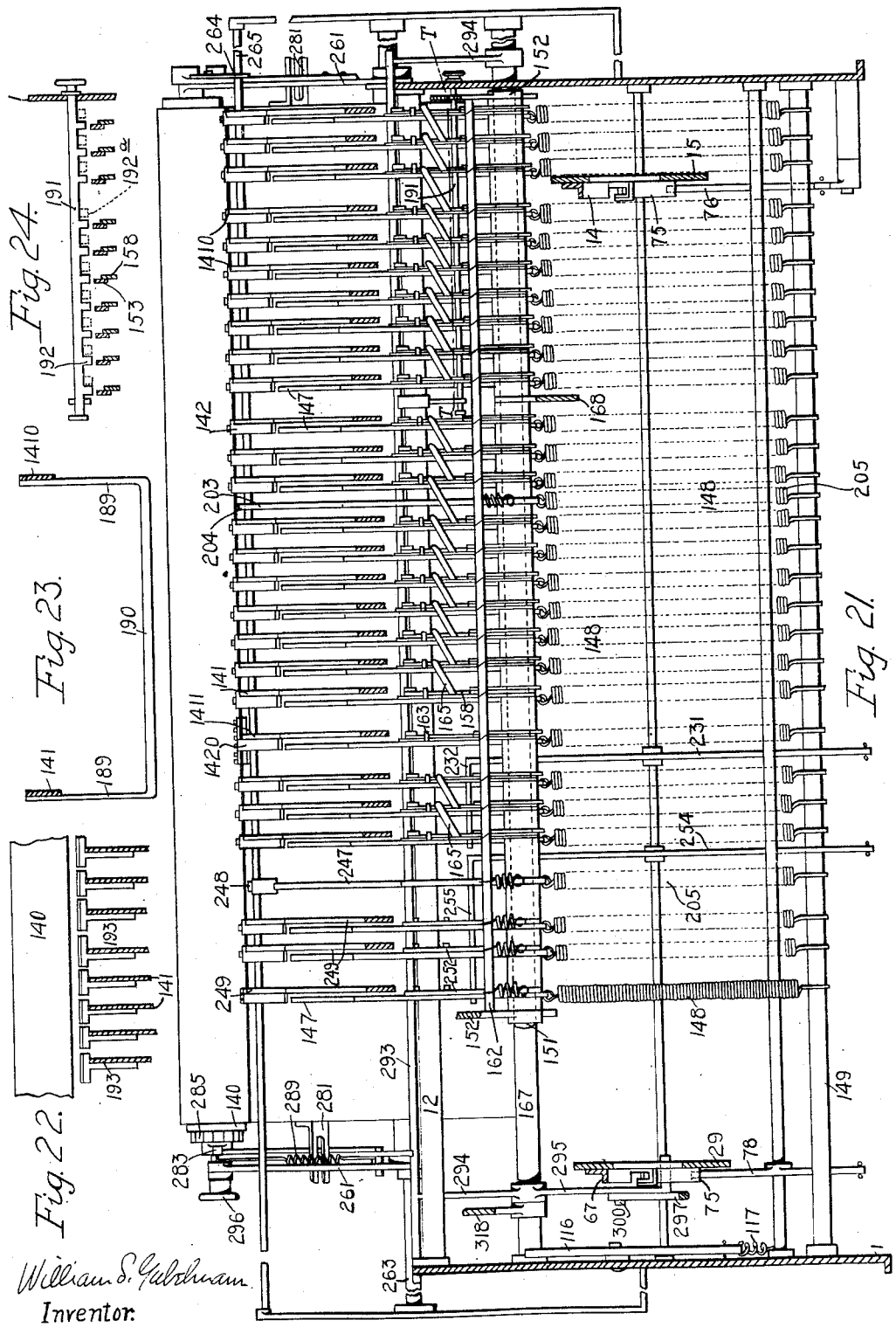

Jan. 7, 1930.   W. S. GUBELMANN   1,742,521
ADDING AND RECORDING MACHINE
Original Filed Jan. 10, 1900   11 Sheets-Sheet 9
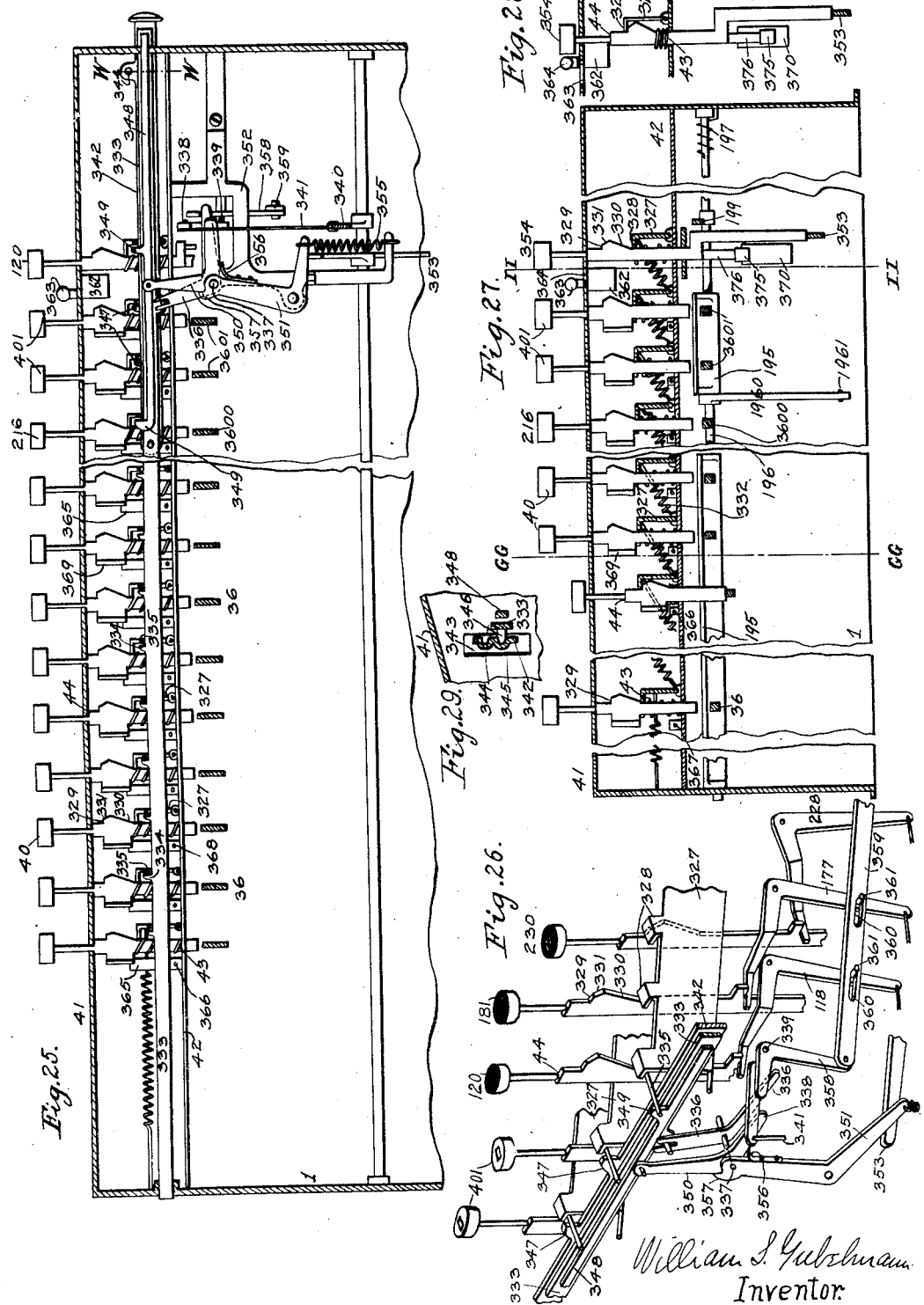
William S. Gubelmann
Inventor Jan. 7, 1930.   W. S. GUBELMANN   1,742,521
ADDING AND RECORDING MACHINE
Original Filed Jan. 10, 1900   11 Sheets-Sheet 10
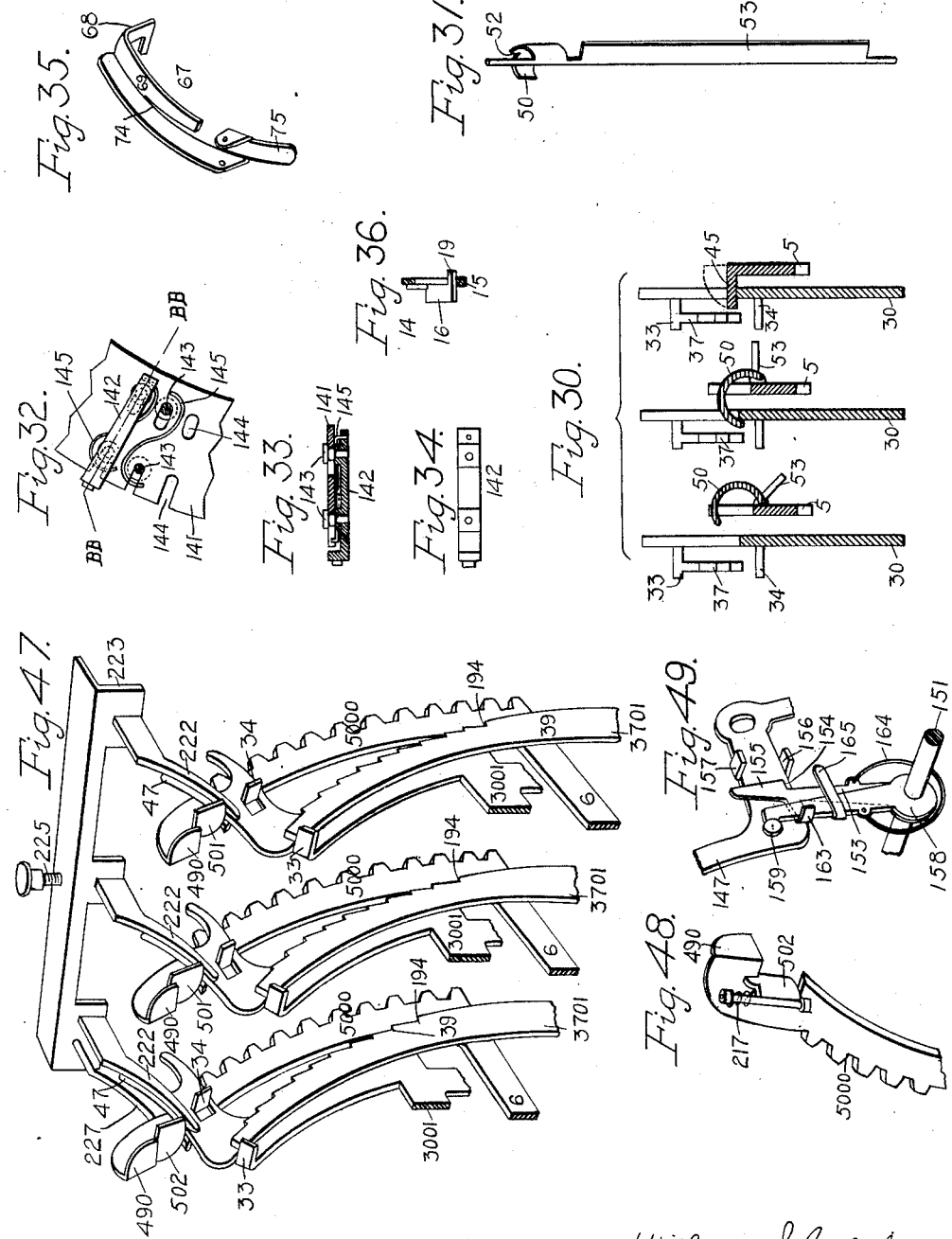
William S. Gubelmann
Inventor Jan. 7, 1930.   W. S. GUBELMANN   1,742,521
ADDING AND RECORDING MACHINE
Original Filed Jan. 10, 1900   11 Sheets-Sheet 11
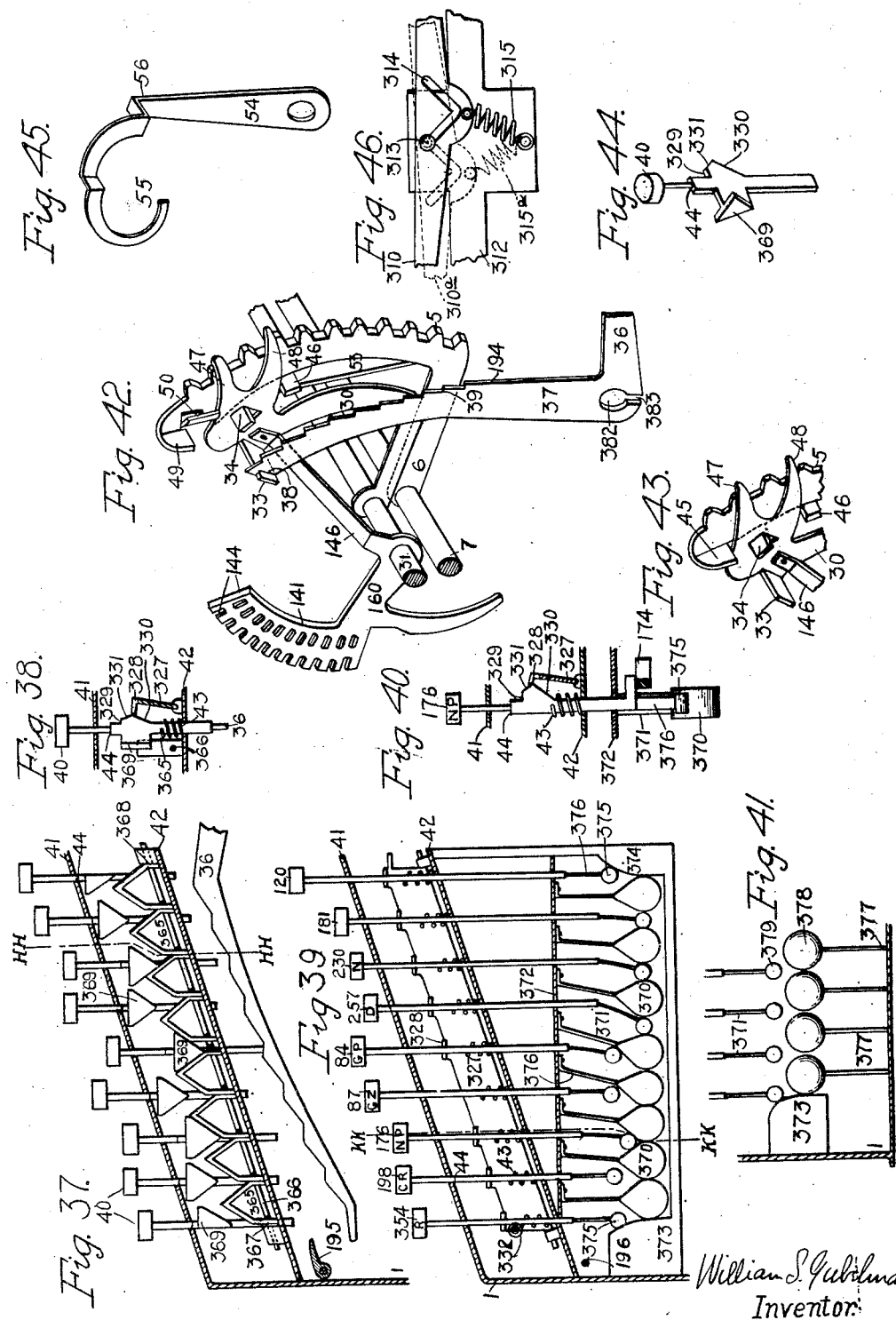
William S. Gubelmann
Inventor

Patented Jan. 7, 1930

1,742,521

UNITED STATES PATENT OFFICE

WILLIAM S. GUBELMANN, OF BUFFALO, NEW YORK

ADDING AND RECORDING MACHINE

Original application filed January 10, 1900, Serial No. 1,004. Divided and this application filed July 30, 1917. Serial No. 183,397.

This invention relates to improvements in adding and recording machines and the like, and is a division of my application Serial No. 1,004, filed Jan. 10, 1900, and eventuating in Patent No. 1,429,201, dated September 12, 1922.

The principal objects of the invention are: to provide means whereby the number of individual adding operations may be registered and recorded consecutively; to improve the means for adding and recording numbers; to permit of printing words in connection with the numbers which have been added; to provide means whereby two separate sets or groups of numbers may be added simultaneously; to permit of printing the date together with the numbers which are added, to provide an improved construction of paper carriage and connecting parts; to provide groups of keys with distinctive marks so as to facilitate manipulating the same; to provide means which prevent the depression of more than the correct number of keys; to provide means for readily producing vertical and horizontal ruling on the record, and to improve the machine in other respects.

In the accompanying drawings consisting of eleven sheets:

Figure 2 is a vertical longitudinal section of the same, taken substantially in line A—A, Figure 1, and showing the adding and recording mechanism of one column or set of keys in the normal or inactive position.

Figure 3 is fragmentary sectional elevation of the printing mechanism of the rows of keys viewed from the side opposite to that shown in Figure 2.

Figure 4 is fragmentary sectional elevation taken in line B—B, Figure 1, and showing the devices whereby numbers are printed in duplicate.

Figure 5 is a horizontal section in line C—C, Figure 3.

Figure 6 is a vertical section in line D—D, Figure 3.

Figure 7 is a view similar to Figure 2 with the paper carrying device omitted and showing the parts of the adding and recording mechanism in a shifted position.

Figure 8 is a fragmentary longitudinal sectional elevation taken substantially in line E—E, Figure 1, and showing the mechanism whereby words are printed.

Figure 9 is a fragmentary longitudinal sectional elevation taken substantially in line F—F, Figure 1, and showing the mechanism whereby the number of adding operations of the machine are separately added and recorded.

Figure 10 is a fragmentary elevation of one of the main registering gear segments viewed from the side opposite to that shown in Figures 2, 7 and 9.

Figure 11 is a fragmentary longitudinal sectional elevation taken substantially in line G—G, Figure 1, and showing the mechanism whereby the months and days are recorded.

Figure 12 is a similar section, taken in line H—H, Figure 1, and showing the mechanism whereby the year is printed.

Figure 13 is a similar section, taken in line I—I, Figure 1, and showing the preferred means for producing vertical ruling on the sheet which receives the record.

Figure 14 is a longitudinal sectional elevation, taken substantially in line K—K, Figure 1, and showing particularly the paper carriage and the mechanism whereby different parts of the machine may be thrown into and out of gear.

Figure 15 is a vertical transverse section, on a reduced scale, taken in line L—L, Figure 14, and showing the means for supporting two rolls of web-paper, for manifold recording.

Figure 16 is a fragmentary vertical section, taken in line M—M, Figure 15, and showing the means for holding the paper spindle in place.

Figure 17 is a detached side elevation of the paper carriage, viewed from the side opposite to that shown in Figure 14.

Figure 18 is a fragmentary vertical section, taken substantially in line N—N, Figure 2.

Figure 19 is a vertical section, taken substantially in line P—P, Figure 2.

Figure 20 is a fragmentary transverse section, taken in line Q—Q, Figure 2, and showing the means for adjusting the paper carriage lengthwise of the line of printing.

Figure 21 is a vertical transverse section taken in line R—R, Figure 2.

Figure 22 is a fragmentary section taken in line S—S, Figure 7, and showing the preferred means for producing horizontal or cross ruling on the surface which receives the record.

Figure 23 is a fragmentary cross section showing the means for connecting one of the main printing segments with its companion duplicate printing segment.

Figure 24 is a fragmentary horizontal section taken in line T—T, Figure 21, and showing the means whereby the duplicate printing segments may be rendered operative and inoperative.

Figure 25 is a fragmentary transverse sectional elevation taken in line U—U, Figure 2, and showing the mechanism for holding the keys in their depressed position and for releasing the same.

Figure 26 is a fragmentary perspective view of the key-holding and releasing mechanism.

Figure 27 is a fragmentary transverse sectional elevation, taken in line V—V, Figure 2.

Figure 28 is a similar view showing one of the keys locked in a depressed position.

Figure 29 is a fragmentary vertical section in line W—W, Figure 25.

Figure 30 is a fragmentary horizontal section, on an enlarged scale, taken in line AA—AA, Figure 2.

Figure 31 is a perspective view of one of the latches forming part of the mechanism, whereby the addition of numbers is carried from each registering dial to the next higher dial.

Figure 32 is a fragmentary sectional side elevation of one of the printing segments showing the means for mounting the type movably thereon.

Figure 33 is a cross section of the type segment taken in line BB—BB, Figure 32.

Figure 34 is a side view of one of the type carriers viewed from the side opposite to that shown in Figure 32.

Figure 35 is a perspective view, showing one of a pair of substantially similar cams, one of which serves to shift the dial operating segments into their operative position and the other one of which serves to shift the parts into position for printing a total of the added numbers.

Figure 36 is a vertical section in line CC—CC, Figure 7.

Figure 37 is a fragmentary longitudinal sectional elevation, taken in line GG—GG, Figure 22, and showing the mechanism whereby only one key can be held in a depressed position at a time.

Figure 38 is a cross section in line HH—HH, Figure 37.

Figure 39 is a fragmentary longitudinal sectional elevation, taken in line II—II, Figure 27, and showing the mechanism whereby a group of keys may be held in a depressed position and this group will be released if any keys in excess of the proper number are depressed.

Figure 40 is a cross section in line KK—KK, Figure 39.

Figure 41 is a fragmentary longitudinal section showing a modification of the mechanism for locking and releasing a group of keys.

Figure 42 is a fragmentary perspective view showing the key-lever, the gear segment, the controlling arm and the printing segment of one of the higher columns of numbers.

Figure 43 is a fragmentary perspective view of the units gear segment and controlling arm of the main adding mechanism.

Figure 44 is a perspective view of one of the registering keys.

Figure 45 is a perspective view of one of the trip arms forming part of the device whereby a number is carried from a lower to a higher dial.

Figure 46 is a fragmentary view, on an enlarged scale, of the mechanism for automatically reversing the ink ribbon of the recording mechanism when the same reaches the end of its movement in either direction.

Figure 47 is a fragmentary perspective view of the auxiliary adding mechanism.

Figure 48 is a fragmentary perspective view of the units gear segment of the auxiliary adding mechanism.

Figure 49 is a fragmentary perspective view of the hammer operating mechanism.

Like letters of reference refer to like parts in the several figures.

Figure 1:
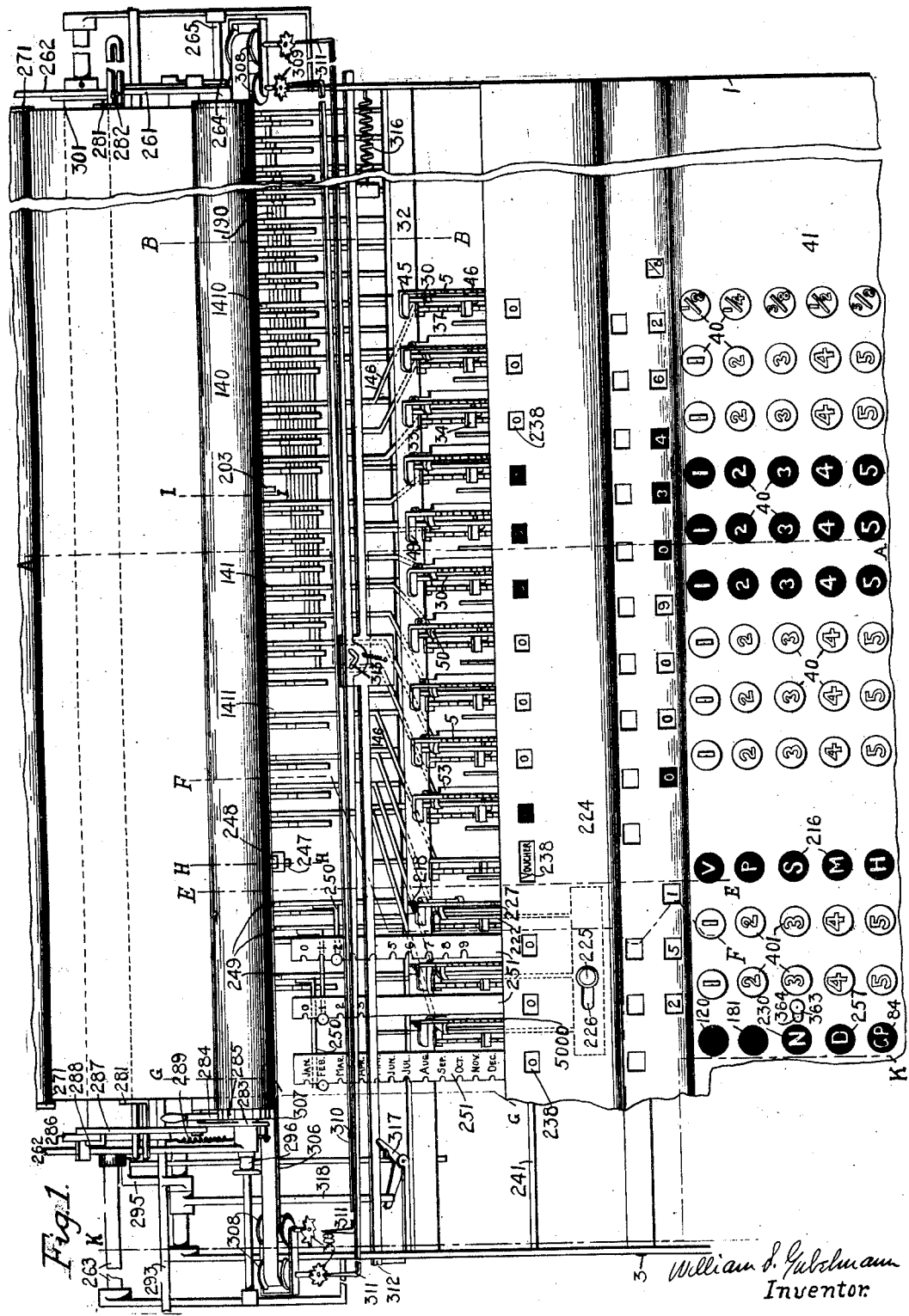
Figure 1 is a fragmentary top plan view of my improved adding and recording machine.

1 represents the main frame of the machine which may be of any suitable construction so as to support the working parts of the machine.

2, Figures 2, 7, 9, and 18, represents a number of main dials which register the total of the numbers which are added together. These dials consist preferably of cup-shaped wheels which are numbered on their peripheries and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into one eighths so as to indicate fractions of a cent in eighths, and the remaining dials are graduated on their periphery according to the decimal system into tenths. As shown in the drawings ten of these dials are shown and extend from fractions of a cent to tens of millions, but if desired, additional dials may be added to the right and to the left of the series, if it is desired to register smaller divisions of a cent or more than tens of millions. Each of the dials 2 is provided on its lefthand side with a gear pinion 4, which is rigidly connected therewith, as shown in Figures 2, 7, 9, and 18.

The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial. Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rock-arms 8 are connected by a transverse bar 10 which compels the two arms to move back and forth together. In the normal position of the gear segments when the machine is at rest these segments are retracted rearwardly out of engagement from the dial pinion of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11 (Fig. 14) connecting the rock-arms 8 with a stationary part of the frame. Figure 14 shows one of the springs 11 connecting one of the rock-arms 8 with a transverse stationary bar 12 in the rear part of the machine. The gear segments are moved forwardly so that their teeth engage with the dial pinion 4, by means of a shifting rock-arm 13, which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions.

14 represents a cam whereby the gear segments are engaged with the dial pinions. This cam is mounted on the upper portion of a vertically swinging rocking frame 15 which is arranged on the right hand side of the machine. This cam is provided at its front end with an incline or cam face 16 and at its rear end with a concentric face 17. When the cam is in its rearmost or retracted position, its incline stands in rear of a roller or projection 18 on the rear end of the shifting arm 13, as shown in Figures 2, 7, 9, and 19. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 and the parts connected therewith, but is affected by said arm at the last portion of the backward movement of the cam, at which time the back or lower side of incline 16 engages with the roller 18, which lifts said incline and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking frame 15. The upward and downward movement of the front end of the cam is limited by means of a lug 19 projecting from the side of the cam and engaging with a slot in the adjacent part of the rocking frame 15, as shown in Figures 19 and 36.

The rocking frame 15, is secured with its lower portion to a transverse rock-shaft 20 journaled in the main frame and provided outside of the frame with a hand crank 21, as shown in Figure 19, whereby this shaft is rocked and the parts connected therewith are operated.

The gear segments 5 are raised to their highest position by means of a return or lifting bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which support at their other ends a transverse bar 25 which transverse bar is connected at its ends, by two links 26, with the lifting plates 23, whereby upon raising the lifting arms 24, the lifting bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested.

Each of the gear segments is yieldingly held in contact with the lifting bar 22 by a spring 27 which connects the arm of the segment with the transverse bar 25. If the downward movement of the gear segment is arrested while the whifting arms 24 continue to move downwardly, the lifting bar 22 is moved away from the underside of the arm of the gear segment and the spring 27 is strained.

The transverse bar 25 is arranged at one end in a segmental notch 28 formed in the front part of the rocking frame 15, as shown in Figures 2, 7, 9 and 19 and its opposite end is arranged in a similar segmental notch 28, formed in a rocking frame 29 (Fig. 19) which is secured to the operating shaft 20 on the left-hand side of the machine.

When the machine is at rest as shown in Figure 2, the transverse bar 25 engages with the front side of the notches 28 in the rocking frames 15 and 29. Upon turning the rocking shaft 20 forwardly by means of its handle 21 in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly to the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement with the dial pinions.

Upon now turning the rock-shaft 20 backwardly by means of the handle 21, the rocking frames are moved backwardly until the front ends of the notches engage with bar 25. When the latter is so engaged it is moved backwardly with the rocking frames to the end of their rearward movement which causes the transverse bar 25 to lift the lifting bar 22 and the gear segments which have been depressed, into their highest or normal position. During this upward movement of the depressed gear segments they are out of engagement with the dial pinions, whereby the dials are not turned backwardly with the segments, but remain in their shifted position.

30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 9, 18, 30, 42, 43, and 47. The rear part of the lower end of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out of one piece with the controlling arm.

The operation of the registering devices is controlled by a number of elbow-shaped key levers which are arranged side by side and pivoted to a transverse supporting rod 35. Each key lever is provided with a lower actuating arm 36 which projects forwardly and an upper stop arm 37 which projects upwardly along the left hand side of one of the controlling arms and gear segments, as represented in Figures 2, 7, 18, and 42. Each of these key-levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward movement. If the gear segment while so held against downward movement is moved forward into engagement with the adjacent dial pinion, and the rocking frames are turned forwardly for depressing the gear segment, the spring 27 of this segment will be strained without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon, or in other words the stop shoulders are arranged radially out of line with one another and different distances from the pivot of the key lever. These stop shoulders of the key lever are adapted to be moved forwardly into the path of the stop lug 34, on the controlling arm. The stop shoulders are arranged different distances from the stop lug 34, of the controlling arm, so that by moving different stop shoulders of the key lever into the path of the stop lug of the controlling arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug.

The stop shoulders of the key lever are so arranged that the distance from the stop shoulders to the path of the stop lug 34 gradually grows less from the uppermost stop shoulder to the lowermost stop shoulder. The relative position of the different stop shoulders of the key lever is such that when its locking shoulder 38, remains in engagement with the locking lug 33, and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly, upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion, turns the same forward. By turning the key lever forward more or less and moving one or the other of its stop shoulders into the path of the stop lug 34, of the controlling arm, the distance which this arms descends can be varied, thereby varying the number of spaces which its gear segment turns the adjacent dial.

*Main number key mechanism*

40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right hand side of the machine contains seven keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands of dollars.

The lowest numbers of the several columns of keys are arranged transversely in a row on the rear part of the key-board and the corresponding higher numbers of the several columns are arranged likewise in transverse rows and progressively in their order toward the front end of the key-board.

Each of the registering keys is yieldingly held in an elevated position by a spring 43 (Figs. 25 and 27) surrounding the stem of the key and connected at its upper end to the key and bearing with its lower end against the bottom of the key-board. The upper movement of each key is limited by a shoulder 44 formed on the upper part of its stem and engaging with the underside of the top of the key-board, as represented in Figures 25, 27, 38, and 39.

The downward movement of all of the keys is substantially the same, but the arrangement of each column of keys lengthwise of the lower actuating arm of each key lever causes the keys to bear against the lever at different distances from its pivot so that by depressing different keys the same distance, the key lever will be turned different angular distances. The keys having the lowest numbers bear against their respective key levers nearest the pivot and consequently the levers are thereby thrown the greatest distance, and the uppermost stop shoulders are shifted into the path of the stop lug 34, of the respective controlling arms. The throw of each key lever upon depressing any one of its keys is so adjusted, that the proper stop shoulder on its upper arm is moved into the path of the stop lug 34, of the controlling arm and the downward movement of the respective gear segment is arrested after having turned the adjacent dial gear pinion a number of spaces corresponding to the number of the key which is depressed.

Loose connection for segments

The loose connection between each controlling arm and its gear segment, heretofore referred to, is shown in its simplest form in the connection between the controlling arm and the gear segment, which are controlled by the initial or lowest column of registering keys. As shown in Figures 1, 18, 30 and 43, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radial with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device, except the highest device are combined with carrying devices, whereby each registering dial, upon making one complete turn, causes the next higher dial to be turned forward one space, thereby carrying up a number from one order to the next higher order. The loose connections between the controlling arms and the segments and the carrying mechanism of the higher registering devices are constructed as follows:—

As shown in Figures 1, 2, 7, 18 and 43, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device. The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lug 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2, 30 and 43.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51 (Fig. 10), the movement in this direction being limited by a shoulder 52 arranged on the latch and bearing against the right hand side of the gear segment, as shown in Figure 10. 53 is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and forwardly projecting hook 55, and in front and below said hook with a bend forming a bearing finger 56. 57 represents trip cams arranged on the left-hand side of each registering dial pinion and connected with the adjacent pinion and dial, but separated from the pinion by an intervening space or groove. The face of each of these cams begins at its lowermost point near the axis thereof and then extends outwardly in a spiral line terminating with its highest point radially in line with its lowermost point with which it connects abruptly. The trip cam of the fractional registering device has its face divided into eight parts, each part of which is arranged one-eighth of a space further from the center of the cam than the preceding part, while the trip cams of the higher registering devices each has its face divided into ten parts, each part being arranged one-tenth of a space farther from the axis of the cam than the preceding part. Each of the trip arms 54 extends upwardly along the right-hand side of the trip cam of a lower registering device and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figures 2 and 9. As the trip cam is turned in the direction of the arrow, Figure 2, at the same time that its dial and gear pinion are moved forwardly by the adjacent gear segment during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement part of the trip arm, its hook strikes the rear side of the trip plate 53 of the next higher registering mechanism and turns the same forwardly, as shown in Figure 30, thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms. The trip plate 53 of each registering device is so arranged and is of such length that the hook of the next lower trip arm can engage with the rear side of the plate, for disengaging its latch in any position of the gear segment carrying the plate. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of such key lever is preferably effected by a spring 60 which connects the upper arm of the key lever with the transverse shaft 9, as shown in Figures 2 and 7, or some other convenient part of the machine. The lower guide lug 46 on the gear segment compels the arm to rise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents. The complete turns of each of the following registering devices are in like manner carried or transferred to the next higher dial by the respective carrying device. The dial which records the highest number, in this instance the millions, is preferably operated only by the adjacent carrying device of the next lower dial and is incapable of being operated directly from the key-board because it is not provided with a key operating mechanism. The mechanism whereby the dials 2 are all turned back to zero or the place of beginning after the addition of numbers has been completed is constructed as follows:

61 (Figs. 2 and 7) represents a series of feeling rock levers which are adapted to shift the key levers, so as to permit the gear segments to descend the proper distance for resetting or restoring the main registering dals to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever. The feeling levers have their fingers normally arranged in rear of the cams 57 and each of these levers is turned so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull spring 65, as represented in Figures 2, 7 and 19. This pull bar is connected at its ends to the lower end of two depending pull or rock arms 66, which are secured at their upper ends to the rock shaft 9, as shown in Figure 19. Upon turning this rock-shaft, so as to swing its depending pull arms backwardly the feeling levers are turned by means of the springs 65 so as to move the upper arms of these levers forwardly. This movement of the rock-shaft 9 is effected by a cam 67 (Figs. 14, 21 and 35), which is mounted on the left-hand side of the rocking frame 29 and which is constructed substantially the same as the cam 14 which is mounted on the rocking frame 15. As shown in Figures 14 and 21, this cam is pivoted at its rear end by a transverse pin to the rear portion of the rocking frame 29 and is provided at its front end with an incline or cam face 69, and in rear of the incline with a concentric face 68. The cam 67 can be raised and lowered with its front end into an inoperative or operative position, this movement being limited by means of a lug 70 arranged on the cam as shown in Figure 19, and projecting into a slot 71 in the adjacent rocking frame in the same manner in which the movement of the cam 14 is limited, as shown in Figure 36.

72, Figures 14 and 19, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 14, so that when the rocking frame 29 is moved forwardly, the cam 67 will clear the roller 73 of the rock arm 72 and not disturb the rock shaft 9 and the parts connected therewith.

If it is desired to restore all of the dials 2 to zero, the cam 14 is raised into its inoperative position, shown by dotted lines 14 in Figure 2, and the cam 67 is lowered into its operative position, as shown by dotted lines 67ª in Figure 14. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of their upper arms engage with the spiral surfaces of the trip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent dials they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever, upon being moved forwardly, bears against the lowest part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage the several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22 together with the rocking frames simply stretches these springs until the bar reaches the end of its downward movement. If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments, which are free to move in this direction takes place while the gear segments are in their retracted position and out of engagement from the dial pinions, so that the dials are not affected by this movement of the segments. After the rocking frames have reached the end of their forward movement and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions by the rod 22 and connecting parts and turn the dials backwardly. At the end of the upward movement of the gear segments the latter are released, so as to permit them to move into their retracted position, out of engagement from the dial pinions.

During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the backward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been returned to zero, the shoulders 56 of all the trip arms engage with the lowest parts of all the trip cams 57.

The cams 14 and 67 are each provided with a longitudinal slit 74, as shown in Figure 35, so as to facilitate the manufacture of these parts.

The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14 by a spring 77, as shown in Figures 2 and 7. 78 (Fig. 14) is a shifting lever which is pivoted between its upper and lower arms and arranged with its upper arm in rear of the tail on the cam 67 and normally held in engagement therewith by a spring 79, as shown in that figure. 80 represents an elbow lever pivoted below the bottom of the key-board, as represented in Figure 14. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents a shifting key having a depending stem which is guided in top and bottom of the key-board and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 14, or to one of the rock arms 8. The elbow lever is turned in the proper direction for this purpose by a shifting key 87 having a depending stem which is guided in the top and bottom of the key-board and which bears against the upper arm of the elbow lever 85. After the gear segments have been moved forwardly into engagement with the dial pinions, while in the depressed position, the gear segments are retained in this position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 14, leaving the machine in position to resume adding.

Each of the dials 2 is held against turning when out of engagement with its actuating gear segment by means of a detent pawl 103 which engages with the front side of its companion gear pinion, as shown in Figures 2, 7, 9 and 18. The pawls 103 of the several gear pinions are mounted on a transverse pawl bar 104, which is supported at its ends by means of two pawl arms 105, which turn loosely upon the supporting rod or bar 35 of the key levers, as shown in Figures 2 and 18. The pawl arms are moved rearwardly for engaging the pawls of the bar 104 with the gear pinions by means of springs 106, as shown in Figures 14 and 18. These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine, as shown in Figures 2, 14 and 18. As the gear segments move forward into engagement with the gear pinions the shifting rods 107 move the detent pawls 103 out of engagement with the dial pinions and when the gear segments move backwardly the detent pawls are again engaged with the dial pinions by the springs 106.

*Recording mechanism*

For the purpose of recording the numbers which are added together by the above described mechanism a recording mechanism is provided which is constructed as follows:—

140 (Figs. 1, 2, 14, etc.) represents a printing roller or platen which is arranged transversely in the upper, rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms are pivoted. Each of these type segments is provided at its rear end with a segmental row of type carriers 142, which are capable of moving radially back and forth on the type segment.

Each of the type carriers is provided at its rear end with a type and is guided upon the type segment by means of screws or rivets 143 (Figs. 32 and 33) secured to the type carrier and arranged in radial slots 144 formed in the type segment, as shown in Figures 2, 3 and 33. Each of the type carriers is held in its inward or retracted position by means of an S-shaped spring 145, which is arranged between the carrier and the type segment and is secured with one end to the carrier and with its other end to the type segment, as shown in Figures 32 and 33. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm and the registering gear segment connected therewith, the companion type segment will be raised and present one of its type to the printing point.

For convenience in operating the machine, the keys are separated a considerable distance on the key-board and in order to produce a compact record, the printing segments are arranged closer together than the keys and the registering mechanism. In order to permit of this arrangement, each type segment and its corresponding controlling arm are connected by a connecting arm 146, as represented in Figures 1, 2 and 42. The connecting arms of the central controlling arms and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point.

147, represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12, arranged in rear of the segments; and each of the hammers is yieldingly held in its forward position by a spring 148 connected at its lower end to a cross bar 149 and at its upper end to a depending arm 150 on the hammer.

151 represents a vertically movable trip bar or rod which is arranged transversely below the hammers and whereby the latter are operated. This bar is supported at its ends upon the rear ends of the rock arms 152 which turn loosely with their front ends on the rod 31 supporting the type segments and controlling arms.

153 represents a number of hammer or trip pawls, whereby the hammers are retracted preparatory to delivering a blow against the type carriers which are at the printing point. One of these pawls is arranged adjacent to each hammer and pivoted loosely at its lower end to the trip bar 151, and its upper end is provided on its rear side with a downwardly facing hook or shoulder 154, and above said shoulder with a trip face 155, as shown in Figure 49. Each of the hammers is provided in front of its pivot adjacent to the upper end of the hammer pawl with a lower trip lug or shoulder 156 and an upper trip lug or shoulder 157. When the parts are at rest, the hammer pawl 153 is raised into its highest position and the hammer is in its normal position with its lower trip lug 156 below and in rear of the hook of the hammer pawl and with its upper shoulder 157 in rear of the trip face of the hammer pawl, as represented in Figures 2, 3 and 49.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same.

158 (Fig. 3) represents a number of upright shifting arms whereby the hammer pawls are moved rearwardly, so that their hooks engage with the lower shoulders of the hammers. One of these arms is arranged adjacent to each hammer pawl, as shown in Figures 3, 6 and 49, and is pivoted at its lower end on the trip bar 151, and its upper end is provided with a roller or projection 159 which bears against a hammer cam 160 on the lower part of the adjacent type segment, as shown in Figures 3 and 7. This hammer cam is provided at its upper end with a receding or low portion, an inclined portion arranged below the low portion, and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm, is limited by means of a stop 163 secured to the upper portion of the hammer pawl and engaging with the front side of the shifting arm, as represented in Figures 3, 5 and 49.

Each hammer pawl is yieldingly held in its rearmost position with reference to its shifting arm by means of a C-shaped spring 164 secured with its ends, respectively, to the hammer pawl and its shifting arm, as shown in Figures 2, and 3. In the lowermost position of a type segment the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder; but instead, the trip face of the hammer pawl slides idly against the shoulder 156 without retracting the hammer, whereby no impression of the particular type at the printing line is produced. If the type segment is raised, so as to present one of its lower types to the printing point or line, the incline of its cam, during the first part of the upward movement of the segment, moves the shifting arm 158 rearwardly together with the hammer pawl yieldingly connected therewith, so that the hook of the hammer pawl stands over the lower shoulder 156 of the hammer. Upon now depressing the pawl 153 the hammer will be retracted and released near the end of the downward movement of the pawl, and will be quickly swung up by the spring 148 thereby delivering a blow against the type at the printing point and producing an impression thereof.

The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

*Automatic printing of zero*

165 (Figs. 3, 7, 21 and 49) represents a number of transfer or coupling fingers which enable the ciphers in a number to be printed automatically. One of these transfer fingers is secured to each of the shifting arms 158, as represented in Figures 3, 7 and 49, and extends laterally toward the right therefrom into engagement with the shifting arm of the next lower hammer pawl, as represented in Figure 21. If any one of the printing segments remains in its lowest position, so that its cipher remains at the printing line and the next higher printing segment has been raised for printing a higher number or digit, the transfer finger of the higher hammer shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer, and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting arm, and the shifting arm of said highest zero-printing segment in turn by means of its transfer finger sets the hammer mechanism of the printing segment of next lower order, etc. This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line.

Only the ciphers below the highest digit in the number to be recorded are thus printed automatically because the printing of a digit depends upon the upward movement of a printing segment, thereby avoiding the printing of ciphers ahead of the highest digit in the number to be recorded. The hammer shifting device of the segment which prints the numbers representing units of cents is, preferably, not provided with a transfer finger to operate on the hammer shifting device of the segment which prints fractions of a cent, because it is proper that the space to the right of the lowest integer shall remain blank when no fraction is recorded therein.

The trip bar 151 is raised by one or more springs 166 (Fig. 8) which connect this bar with the transverse rod 12, and the upward movement of the bar 151 is arrested when the hammer operating pawls reach their highest position by a transverse bar 167 (Figs. 2, 3, 14 and 21) which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected, and the cross bar 169 bears against the rear or upper shoulder of the notch of the hook 168, as represented in Figure 2.

Upon swinging the rocking frames forward, the incline of the cam 14 first raises the rock arm 13 and shifts the gear segments into engagement with the dial pinions, and after the segments have been so shifted, the rear shoulders of the notches 28 in the rocking frames engage with the cross bar 25, so that thereafter this bar is carried downward with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downward with the rocking frames until these frames reach the end of their downward movement. During the last portion of the downward movement of the rocking frames the hammer pawls are disengaged, as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective numbers. The hammers do not follow the type carriers to the end of their outward movement but are stopped short, after delivering a blow against the inner ends of the carriers by their depending arms 150 engaging with a rubber facing 170 on the cross bar 167, as shown in Figure 3, so that the types are moved outwardly by the impact of the hammers and are then returned by their springs so as to clear the printing surface.

Non-print mechanism

When it is desired to only add the members and not record the same, the coupling hook 168 is raised with its notch out of engagement with the cross bar 169, which allows the rocking frames and connecting parts to move back and forth without affecting the hammer operating devices. The coupling hook is disengaged from the cross bar by means of an elbow lever 171 secured to a transverse rock shaft 172. The lower arm of the elbow lever is connected with the shaft 20 by a spring 173, whereby the lever and the shaft carrying the same are turned in the direction for disconnecting the upper arm of the lever 171 from the hook 168, thereby permitting the latter to engage the bar 169.

174 (Fig. 14) represents an elbow lever arranged below the bottom of the key board and having its lower arm connected by a line or cord 175 to the upper arm of the elbow lever 171. 176 represents a shifting key having a depending stem which is guided in the top and bottom of the keyboard and which engages with its lower end against the upper arm of the elbow lever 174. Upon depressing this key the elbow lever 174 is turned in the direction for moving the rock arm 171 into engagement with the coupling hook 168 and disengaging the latter from the cross bar 169, thereby throwing the recording mechanism out of gear. Upon releasing the key 176, the rock arm 171 is permitted to swing backwardly and allow the coupling hook to engage with the cross bar 169, thereby throwing the recording mechanism into gear. When the gear segments and the printing segments are thus operated relatively to the keys which have been depressed, the number represented by the depressed keys is registered and also recorded by the printing mechanism. The addition of further numbers proceeds in like manner the several numbers added successively by the registering mechanism but each number is printed individually by the recording mechanism.

Total-printing and clearing

When it is desired to print or record the total at the foot of the column of the numbers which have been printed, the operation is as follows:—The key 84 is first depressed, thereby raising the cam 14 into an inoperative position and lowering the cam 67 into an operative position. Upon now moving the rocking frames 15 and 29 forwardly the feeling levers 61 are turned forwardly so as to move their feeling fingers forwardly into engagement with the respective cams 57 and at the same time each feeling lever carries the adjacent key lever forwardly so that its particular stop shoulder 39 corresponding to the position of the trip cam 57 and its dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion dial. During the last part of the forward and downward rocking movement of the rocking frames the hammers are operated and the particular types at the printing line are impressed on the platen. Upon now swinging the rocking frames backwardly, the gear segments are raised while still in a retracted position out of engagement with their companion dial pinions, thereby permitting further numbers to be added to the total already registered on the dials. If however, it is desired to turn the dials back to zero, after the total of the added numbers has been printed or recorded, the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly when the segments reach the end of their upward movement, the dials have been turned backwardly a number of spaces corresponding to the number on the dial, thereby turning all of the dials to zero.

In the highest registering and recording mechanism which registers and records the highest numbers for which the machine is designed, the stop arm 37 having the differential stops, is not provided with a lower key operated arm 36, because the arm 37 is only used to arrest its gear segment and printing segment at different points, for setting the parts preparatory to turning the highest dial to zero or for printing the total of the number indicated by the highest dial.

Duplicate printing by counterpart types

For the purpose of permitting the numbers to be printed in duplicate, for instance, when it is desired to print an amount on a bank check, and the same amount on a stub, the machine is provided with mechanism which is constructed as follows:

1410 (Figs. 1, 19 and 21) represents a number of duplicate printing or type segments which are arranged transversely in line and preferably toward the right of the main printing segments 141, and which are pivoted loosely at their front ends on the supporting rod 31. One of these duplicate number printing segments is provided for each of the main number printing segments, and each duplicate segment is connected with its companion main segment by a U-shaped frame (Fig. 23) which frame is connected by the upper ends of its arms 189 to its duplicate and main segment and has its cross bar 190 arranged transversely below the intervening segments, as shown in Figures 1, 2, 4, 7 and 23. The cross bars 190 are arranged sufficient distances below the segments so that each pair of connected main and duplicate printing segments can be raised to its highest position without interfering with the other segments. For the purpose of permitting the connecting frames of the several pairs of printing segments to be arranged compactly, the arms of the connecting frame are curved concentrically with the pivots of the segments, as represented in Figures 2 and 4.

Each of these duplicate printing segments is provided with type carriers corresponding to and constructed the same as the type carriers of its companion main segment and each of these duplicate segments is provided with a hammer operating device which is constructed the same as the hammer operating devices of the main segments, and the same description and letters of reference, therefore apply to the details of both the main and duplicate printing segments.

Duplicate printing inoperative

If it is desired to duplicate only the small numbers no duplicate segments need be provided for the higher numbered printing segments. For the purpose of throwing the duplicate printing mechanism out of gear when it is not desired to print the numbers in duplicate a horizontal movable bar 191 (Fig. 24) is provided which is arranged transversely in rear of the hammer pawls of the duplicate printing segments and which is provided with a number of forwardly projecting lugs or stops 192, as represented in full lines in Figures 4, 21 and 24. Upon shifting this bar, so that its stops stand in rear of the duplicate hammer pawls, as shown in full lines in Figure 24, these pawls are prevented from being swung rearwardly and operating the hammers. Upon moving this bar so that its stops clear the duplicate hammer pawls, as represented by dotted lines 192ª, Figure 24, these pawls are free to be swung rearwardly by the segment cams 160 into engagement with the hammers, so as to retract the same during the downward movement of the pawls for producing an impression of the types of the duplicate segments which are at the printing line. A suitable key or finger-piece is provided, by the operation of which the bar 191 is shifted into effective position.

Horizontal ruling

For the purpose of producing horizontal or cross ruling upon the sheet or surface which receives the record, the following mechanism is provided:—

193 (Figs. 2, 3 and 22) represents the lowermost type carrier of each of the number printing segments, each of which is provided at its rear end with a horizontal ruling type. Each of these ruling type carriers is constructed the same as the number type carriers with the exception that the front end of each ruling type carrier is widened horizontally, preferably, in both directions in the form of the letter T, as shown in Figure 22, and the ruling type extends transversely from end to end of the widened part of this carrier, so that the ruling types, when placed transversely in line and driven against the platen, will produce a practically continuous line transversely on the recording surface. Each of the number key levers is provided on the front side of its upper arm with a ruling stop or shoulder 194, which is arranged one space below the lowermost number registering stop or shoulder 39.

Upon swinging the key levers, so as to bring their ruling shoulders 194 into the path of the lugs 34 of the controlling arms, the latter together with the gear segments connected therewith are depressed upon moving the rocking frames 15 and 29 forwardly, until the stop lugs 34 of the controlling arms engage with the lowermost or ruling shoulders 194 of the key levers. When the controlling arms reach this lowermost position, the printing segments connected therewith have been raised to their highest position and present the ruling types of all of the segments to the printing line. During the last portion of the forward movement of the rocking frames 15 and 29, while the ruling types are at the printing line, the proper hammers are operated for producing an impression of these types.

The key levers are turned simultaneously for bringing all of their ruling shoulders simultaneously into the path of the stop lugs of the respective controlling arms by means of a rocking plate 195 which is arranged transversely in front of the lower arms of the key levers and overhangs the front ends thereof, as represented in Figures 2, 7 and 27. This rocking plate is secured to a transverse rock shaft 196 which is journaled in the frame of the machine and which is turned for holding the rocking plate in its uppermost position out of engagement with the key levers by means of a spring 197, as shown in Figure 27.

198 (Fig. 14) represents a shifting key whereby the parts are shifted to permit of producing cross or horizontal ruling. This key is provided with a depending stem which is guided in the top and bottom of the keyboard and which engages against the rear end of a rock arm 199 projecting rearwardly from the rock shaft 196, as represented in Figure 14. Upon depressing this key, the rocking plate 195 is turned in the direction for depressing the front arms of all the number key levers and bringing the ruling shoulders 194 on the upper arms thereof into position for arresting the type segments during their upward movement when the ruling types arrive at the printing point.

In order to prevent the gear segments from meshing with the dial pinions during the cross ruling operation the position of the cams 14 and 67 is reversed at the same time that the plate 195 is depressed. This is effected by a depending arm 1960 secured to the shaft 196 and connected by a cord or wire 1961 which the branch wires 82, 83 leading to the shifting levers 76 and 78, as represented in Figures 14 and 27. When it is desired to produce horizontal ruling on the recording surface, the key 198 is depressed thereby raising the cam 14 into an inoperative position, depressing the cam 67 into an operative position and moving all the number key levers with their ruling shoulders 194 into the paths of the stop lugs of the controlling arms. Upon now moving the handle 21 (Fig. 19) forwardly, the rocking of the frames 15 and 29 first causes the gear segments together with their controlling arms to be moved downwardly until arrested by the ruling shoulders of the keys, in which position of the parts, the printing segments have been raised with their ruling types to the printing line. The continued forward movement of the rocking frames operates the hammer tripping mechanism and produces an impression of the ruling types on the recording surface. Upon now moving the handle 21 backwardly and releasing the key 198, the parts resume their normal position. While the cams 14 and 67 are reversed so as to move the gear segments downwardly out of engagement with the dial pinions for producing horizontal ruling, the feeling levers are also shifted, but this movement of the feeling levers is of no effect.

Instead of producing cross ruling by means of a transverse row of independent types, this ruling may be effected by a separate ruling plate 200 which extends transversely along the entire width of the space to be ruled, as represented in Figure 55 of Patent No. 1,429,201.

In this modified construction of the horizontal ruling device, the ruling plate may be supported by upright arms 201 from a transverse bar or shaft 202, and may be operated by any suitable mechanism.

Vertical ruling

Mechanism is provided whereby vertical ruling may be produced on the recording surface, this mechanism being constructed as follows:—

203 (Figs. 1, 13, 19 and 21) represents an upright ruling lever which turns loosely on the supporting bar 12 and which is arranged between the dollars and dimes printing segments. The upper arm of the ruling lever is provided with a vertical ruling blade 204 (Fig. 13) which is arranged close to the platen when in its upper position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface for producing a vertical ruling impression thereon. This pawl is pivoted at its lower end on the cross bar 151 and is yieldingly held with the hook 208 on its upper arm in engagement with a shoulder 209 on the ruling lever by means of a spring 210 which connects the lower arm of the ruling lever with the rod 162.

In the uppermost position of the bar 167 the ruling pawl engages the shoulder of the ruling lever and upon depressing this bar, the ruling lever is pulled downwardly by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 205 in a direction for throwing its upper arm upwardly, whereby its blade delivers a blow against the recording sheet or surface on the platen and produces a ruling impression thereon. During the last portion of the subsequent upward movement of the ruling pawl 207 its hook again engages over the shoulder of the ruling lever. This construction of vertical ruling devices produces the vertical ruling in sections by successive blows of the ruling blade.

Word-printing mechanism

For the purpose of permitting words to be printed in front of the numbers which are added together the following mechanism is provided:—

1411 (Figs. 1, 8, 19 and 21) represents a word printing segment which is mounted loosely on the rod 31 next to the highest number printing segment of the main number recording mechanism. This segment is provided with a number of radially movable carriers 1420 (Figs. 8 and 21), which are constructed the same as the carriers of the number printing segments and each of which is provided on its face with a word-type. The words of these types are selected according to the purpose or business for which the machine is to be used. For instance, if the machine is to be used in a bank, types representing the words "Vouchers", "Checks", "Drafts", "Bills", and similar words common to the banking business may be used. When the machine is designed for use in a restaurant, the words "Soup", "Vegetables", "Meats", "Dessert", and other words peculiar to this business may be used.

The position of the word-type segment is controlled by a key lever 3600, Fig. 8, which turns on the bar 35, is similar to the number key levers, and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder 3800 which is adapted to be engaged by a locking lug 3300 on the controlling arm, as represented in Figure 8. The controlling arm 3000 is connected with the word-printing segment by a connecting bar 1460. The stop shoulders on the upper arm of the word-key lever are so arranged that upon swinging this lever so as to carry different shoulders into the path of the stop lug on the controlling arm, the latter will be arrested at different points in its downward or forward movement and the word-printing segment connected therewith will be stopped at different points in its upward movement and present the particular word type to the printing point which corresponds with the shoulder or stop on the word-key lever.

The upward movement of the controlling arm 3000 is limited by its rear locking lug 3300 engaging with the stop bar 32 which arrests the upward movement of the controlling arms 30 of the number registering and recording mechanism. The downward movement of the controlling arm 3000 and the simultaneous upward movement of the word printing segment is effected by a spring 215 which yielding connects this arm with the bar 25 to which the registering gear segments are connected.

216, Fig. 1, represents a row of word-keys having depending stems which are guided in the top and bottom of the key-board and which engage against the upper side of the front arm 3600 of the word key lever at different distances from the fulcrum thereof. Upon depressing any of the word-keys, the word-key lever will be turned the proper distance to bring its proper stop shoulder into the path of the stop lug of the companion controlling arm and arrest the word-type segment during its upward movement, when the word-type corresponding with the word of the depressed key has reached the printing line. When the respective word-type is in this position the same is driven against the recording surface for producing an impression thereon, at the same time that the printing of the numbers by the numbering printing segments, is effected. The word-types are driven against the platen by a hammer-operating mechanism which is constructed the same as the hammer-operating devices of the number printing mechanism, and the same letters of reference are therefore used to denote the same. The word-key lever s yieldingly held in its normal position by a spring 600.

Auxiliary mechanism

An auxiliary adding mechanism is provided which permits of registering and recording the individual or separate number of adding and recording operations which have been made by the main adding mechanism and also permits of effecting an addition of numbers different from the numbers which are added by the main adding mechanism.

This auxiliary adding mechanism is constructed as follows:

2000 (Figs. 9 and 18) represents a number of auxiliary dials which are mounted on the left hand end of the dial shaft 3. 5000 represents a number of auxiliary gear segments which are mounted on the transverse rod 7 and are adapted to engage with gear pinions 400 on the auxiliary dials. Each gear segment 5000 is connected with a controlling arm 3001 arranged adjacent to the gear segment by a latch or coupling which at times permits the segments to move independently of the controlling arm. 3601 and 3701 represent auxilary key levers which are operated by auxiliary keys 401 (Fig. 1) and which control the operation of the auxiliary registering and recording mechanism. The detail construction of the dials, gear segments, printing segments, key levers and the parts co-operating therewith of the auxiliary registering and recording mechanism is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three auxiliary dials are shown which permit of registering and recording a total of 999, but additional registering and recording devices may be employed if it is desired to increase the capacity of the machine.

In the auxiliary mechanism each of the higher gear segments 5000 is provided with a pivot latch 501 (Fig. 47) the same as in the main registering mechanism. The lowest or primary gear segment of the auxiliary registering mechanism is provided with a movable latch 502 (Figs. 9 and 47) which is adapted to be engaged with or to be disengaged from the upper guide face on its companion controlling arm. This latch is pivoted on the primary gear segment and yieldingly held in position by a spring 217, shown in Figure 48 so as to overhand the horn of its companion guide arm, as shown in Figures 9 and 47; while upon moving the latch rearwardly so as to clear the controlling arm its gear segment is permitted to drop until a stop 490 on the segment adjacent to the latch bears against the controlling arm. The extent of this drop of the primary segment independent of its controlling arm is equal to one space or number of the registering mechanism the same as in the higher auxiliary registering devices. In the auxiliary registering mechanism the gear segments are not provided with lower stops 46 like those of the gear segments of the main registering mechanism which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross bar 22.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arm strike the shoulders 39 on the key levers which stand in the path of the stops 34. At the end of the forward movement of the rocking frames the gear segments are withdrawn from the dial pinions by the springs 60 and during the subsequent backward movement of the rocking frames the gear segments and controlling arms are raised by the cross bar 22 engaging with the gear segments and with the feet 219 of the arms. The carrying of numbers from the units dial to the tens dial and from the latter to the hundreds dial, and the turning of the dials to zero is effected in the same manner as in the main registering mechanism.

By this organization of the machine, numbers such as sales or pieces of goods can be added and recorded by the main registering mechanism and other numbers such as the rebate on sales and discount on the prices of the goods, can be separately added or recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism, but both sets of registering and recording mechanisms are operated simultaneously by the one universal shifting mechanism for effecting the registration and recording of the numbers which are represented by the different positions of both key controlled devices.

Counting and numbering

For the purpose of permitting counting of the separate number of additions which have been effected on the main registering mechanism the auxiliary adding mechanism is constructed as follows:—

220 (Fig. 9) represents springs whereby the auxiliary controlling arms are connected with the cross bar 25. The spring 220 of the auxiliary hundreds or highest controlling arm is rigidly connected with the cross bar 25, as shown in Figure 19, but the springs 220 of the auxiliary units and tens controlling arms are provided at their lower ends with vertically elongated loops 221 which receive the bar 25, as shown in Figure 9, and which form a slack connection between the springs of the units and tens springs 220 and the bar 25.

222 (Figs. 9 and 47) represents a number of auxiliary stops, whereby the gear segments, when in their foremost position, are permitted to move downwardly only one space when the auxiliary register is used to count the number of additions which have been made by the main registering mechanism. One of these stops is arranged adjacent to the left hand side of each auxiliary controlling arm and is provided on the upper side of its rear end with a curved guide face which corresponds to and is in line with the upper curved bearing face of the controlling arm when the latter is in its highest position, as represented in Figures 9 and 47. The several stops 222 are secured with their front ends to a transversely movable slide 223 which is adjustably secured to the underside of the cover 224 of the registering mechanism by a screw 225 passing through a transverse slot 226 in the cover, as represented in Figures 1, 9 and 47. 227 represents a trip finger secured with its front end to the slide 223 and arranged with its rear end adjacent to the front side of the latch 302 of the primary or units gear segment. 228 represents an elbow lever arranged below the bottom of the key-board and having its lower arm connected with each of the upper arms of the auxiliary feeling levers 610 by springs 229, as shown in Figures 9 and 14. 230 represents a key having a depending stem which is guided in the top and bottom of the keyboard and which bears against the upper arm of the elbow lever 228. During the ordinary adding operation by the auxiliary registering mechanism, the slide 223 is moved toward the left, so that the finger 227 and stops 222 are not in the path of the lugs 490 and latches 501, 502, the springs 229 are loose and do not interfere with the movement of the auxiliary key levers and the spring 220 do not come into use.

When it is desired to count and record consecutively the number of separate additions which are made by the main adding mechanism, the slide 223 is shifted to the right so that its stops 222 stand in the downward path of the stop lugs 490 and latches 501, and 502 of the gear segments and the trip finger 227 stands in the forward path of the latch 502 of the primary or initial gear segment, and the shifting key 230 is depressed, whereby the upper arms of the feeling levers are swung forwardly until their feeding fingers bear against the cams 57 of the auxiliary dials, these levers together with their companion key levers being yieldingly held in this forward position by the springs 229.

Previous to beginning the consecutive counting and recording of the separate additions of the main registering merchanism, the dials are all turned to zero, in which position all of the upper key lever arms 3701 are in their rearmost position and have their locking shoulders 38 in engagement with the locking lugs 33 of the auxiliary controlling arms, whereby the latter are held in their highest position. Upon moving the rocking segments 15 and 29 forwardly after depressing the proper keys of the number to be added on the main registering mechanism, the gear segments are all moved fowardly into engagement with their respective dial pinions and the springs 27 of the several gear segments are then pulled downward by the bar 25.

During the forward movement of the auxiliary tens and hundreds gear segments their latches 501 engage with their companion controlling arms which prevents these gear segments from being depressed by the pull of their springs 27, whereby the tens and hundreds dials are not turned. During the forward movement of the primary or units gear segment its latch 502 engages with the trip finger 227 and is turned backwardly out of engagement with the top of its companion controlling arm, thereby releasing the units gear segment and permitting the same to be pulled downwardly by its spring 27, while in engagement with its gear pinion, whereby the units dial is turned. As the auxiliary gear segments move forwardly into engagement with the dial pinions, their lugs 490 move over the stops 222, but in the foremost position of these gear segments their stop lugs 490 are separated from the stops 222 a distance equal to one tooth of the segments or one space on the dials. The instant the latch 502 of the units gear segment is released from the units controlling arm, while the units gear segment is in its foremost position the pull of the spring 27 depresses the units segment until its stop lug 490 engages with the units stop 222, this movement of the units gear segment causing the same to turn the units dial one space or number. During the subsequent backward movement of the rocking segments 15 and 29 the auxiliary gear segments are withdrawn rearwardly from the dial pinions. While in this rearwardly retracted position the units gear segment is raised by the bar 22 and when the same reaches the upper end of this movement the latch 502 is automatically turned over the units controlling arm by the spring 217 of this latch. This operation is repeated and the units dial is turned one space at a time during every adding operation of the main registering mechanism. When the units dial makes one complete rotation the companion cam 57 releases the units trip arm 54, thereby causing the same to disengage the latch 501 of the auxiliary tens gear segment from the tens controlling arm, whereby the tens gear segment is liberated and permitted to be pulled downward by its spring 27 during the subsequent forward movement of the rocking segments 15 and 29. The tens gear segment moves downwardly until its stop lug 490 engages the adjacent tens stop 222, during which movement the tens gear segment turns the tens dial one space. During the subsequent backward movement of the rocking frames 15 and 29 the tens gear segment is moved backwardly by the springs 11 out of engagement with its dial pinion and upwardly by the bar 22 while in its retracted position at the same time that the units gear segment is retracted and moved upwardly. At the end of the upward movement of the tens gear segment its latch is again turned by its spring into engagement with the tens controlling arm. When the tens gear segment has turned the tens dial one rotation, the auxiliary hundreds gear segment is released by the carrying mechanism between the tens and hundreds registering mechanisms and the hundreds dial is shifted by its gear segment in the same manner as the tens dial.

At the beginning of the counting operation by the auxiliary registering mechanism, the cams 57 engage with their highest parts against the feeling fingers of the feeling levers whereby the upper arms of the key levers are permitted to occupy their rearmost position with their locking shoulders 38 in engagement with the locking lug 33 of the controlling arms, thereby preventing these arms from being depressed by the pull of their springs 220 upon moving the locking frames 15 and 29 forwardly. Upon counting the first number on the units dial the cams 57 thereof, while being shifted with said dial permits the units feeling lever to drop with its feeling finger 62 from the highest to the lowest part of the units cam, thereby causing the upper arm of the key lever to be moved forwardly by the feeling lever, so that the uppermost stop shoulder 39 of the key lever stands in the path of the stop lug of the units controlling arm. In this position of the parts, the units controlling arm is arrested after being moved downwardly one space by the pull of its spring 27 which is strained by the forward movement of the rocking frames 15 and 29. As the counting on the units dial progresses the units cam 57 engages its successively higher parts with the feeling finger of the units feeling lever and moves the same rearwardly one space for each counting operation, and the springs 60 of the units key lever turns the upper arm of the latter backward intermittently in the same measure as the backward movement of the feeling lever permits the same. During every backward step of the upper arm of the units key lever the latter presents a successively lower stop shoulder 39 to the stop lug 34 of the units controlling arm, whereby the latter is permitted to be drawn down by its spring 220 one space farther during every counting operation, although its companion gear segment during this time never moves down more than one space by reason of its stop lug 490 engaging its stop 222, thereby causing its companion printing segment to be shifted to the proper position for printing the number corresponding to its dial. During the upward movement of the units gear segment its controlling arm is also moved upward to its highest position by the rod 22 engaging with the foot 219 of the controlling arm.

When the dial of each register except the highest has completed one rotation the highest part of its cam has turned the feeling lever backwardly to its fullest extent and the upper arm of the respective key lever is again engaged with its locking shoulder underneath the locking lug of the respective controlling arm. The loops 221 at the lower end of the lower controlling arm springs 220 are of such length, as to permit the gear segments to descend in advance of the controlling arms and first turn the dials and cams one space and then the rod 25 engages with the lower end of the loops 221 and pulls the controlling arms downwardly, until each is arrested by the proper stop shoulder 39 on the upper arm of its key lever. By thus moving each lower gear segment down in advance of its controlling arm, the respective cam upon turning from 9 to 0 permits the upper arm of the key lever to be shifted rearwardly and moved with its locking shoulder underneath the locking lug of its controlling arm before the latter can descend, thereby holding the controlling arm and the segment in the highest or zero position, if the dial while registering moves to zero.

When turning the dials of the auxiliary registering mechanism to zero, the latches 501 and 502 and stops lugs 490 of the auxiliary gear segments are moved downwardly in rear of the stops 222 and the trip finger 227, as the gear segments descend in their rearward position. The auxiliary segments while in their lowered position are now moved forwardly into engagement with their dial pinions. During the subsequent ascent of the gear segments in their forward position the stop lugs 490 and the latches 501 and 502 of the segments deflect the stops 222 and trip finger 227, so as to permit these lugs and latches to be moved above the said stops and fingers preparatory to beginning the next counting operation. The co-operating sides of the lugs 490, latches 501, 502, stops 222 and finger 227 are slightly inclined, as shown in Figures 9 and 47, and are sufficiently elastic to permit these parts to pass each other.

231 is an upright shifting lever, Fig. 9, whereby the operation of the printnig mechanism of the auxiliary registering mechanism may be controlled. This lever is provided on its upper arm with a cross bar 232 which is arranged in rear of the hammer retracting pawls of the auxiliary printing segments and its lower arm is connected by a wire or cord 233 with a thumb piece 234 which is guided in an opening in the front part of the frame as shown in Figure 9. The lever 231 is turned by a spring 235 in the direction for moving its across bar forward against the auxiliary hammer pawls, thereby holding the same out of engagement with the hammers 147 of the auxiliary printing segments and preventing the same from effecting recording on the impression surface. Upon pulling the thumb piece 234 forwardly, the lever is turned so as to move its cross bar rearwardly away from the auxiliary hammer pawls, thereby permitting the same to engage the hammers of the auxiliary printing segments for recording the numbers corresponding to the auxiliary registering mechanism. The shifting lever is held in its operative or inoperative position by two shoulders 236, 237 arranged one behind the other on the thumb piece and adapted to engage with the edge of the opening in which the thumb piece is guided.

By adjusting the auxiliary registering mechanism so as to count consecutively and throwing its printing mechanism into gear, numbers may be printed consecutively on the impression surface by simply rocking the handle 21 back and forth. While thus printing numbers consecutively, if none of the registering keys are depressed, the gear segments of the main registering mechanism are moved idly back and forth.

Indicator or detector dials

In order to enable the operator to see which particular character or characters the machine is set for printing after depressing the keys, and thereby detect any errors in the depression of the keys, each of the key levers is provided with an auxiliary dial, indicator, or detector 238 which is turned forward the same number of spaces that the key lever has been depressed and then returned to its initial position when the key lever moves backward into its normal position. In the preferred construction of the detector dials shown in Figures 1, 2, 7 and 18, each of these dials consists preferably of a wheel 238 provided on one side with a pinion 239 which is engaged by a gear segment 240 secured to the adjacent key lever, as shown in Figures 2, 7 and 18.

Upon depressing one of the number registering and recording keys, the detector dial thereof is turned forwardly by the connecting gearing the same number of spaces corresponding with the number of the keys which has been depressed. If a key lever is not depressed its detector dial remains at zero. The detector dial of the word-printing mechanism is in like manner turned by its key lever so as to indicate the word which corresponds to the word of the depressed key.

The dectector dials of the several registering and recording devices are mounted loosely on a transverse supporting rod 241. By means of these detector dials, the operator can see which number and word is represented by the depressed keys, thereby enabling the same to be corrected, if an error occurs, before registering and printing the same.

Date printing

For the purpose of permitting the date to be printed on the impression surface the following mechanism is provided:—

247 (Fig. 12) represents a year printing lever, which is arranged toward the left of the auxiliary registering and numbering mechanism and which is mounted loosely upon the rod 12 which supports the hammer of the printing segments. The upper arm of the year lever is provided with a year type 248 representing the year to be printed, and this lever is turned for moving its type against the platen or the impression surface by means of a spring 205 secured to the lower arm thereof. The year printing lever is turned so that its type moves away from the platen and is then permitted to spring back quickly so as to produce an impression of its type on the impression surface by means of an operating mechanism which is constructed the same as the operating mechanism of the vertical ruling blade 204, shown in Figure 13, and the same reference letters are therefore used to denote like parts in these operating mechanisms.

249 (Figs. 1, 11, 19 and 21) represents three printing segments whereby the months and the days of the months may be printed and which are arranged in the order named on the left hand side of the year printing lever.

Each of these segments is pivoted at its rear end on the same bar 31 which carries the other printing segments and is provided with type carriers which are constructed the same as the type carriers of the other printing segments. The units dating segment is provided with ten digital type carriers. The tens dating segment which prints the days of the month above 9 in connection with the units dating segment is provided with three type carriers bearing the numbers 1, 2 and 3. The month printing segment is provided with twelve type carriers which are provided with type characters representing the different months of the year.

Upon shifting the several type or printing segments of the dating mechanism, so as to carry the desired month and day of the month to the printing line the respective type may be driven against the impression surface for recording the date represented by the same. Each of the months and day printing segments is retained in its adjusted position by means of a catch 250 projecting upwardly from the segment and engaging with the notches of a curved bar 251 secured to the adjacent stationary part of the machine, as represented in Figures 1 and 11. The notches in each of these bars are spaced to correspond with the position of the type, and each of these notches is marked according to the month or day of the month which it represents, as shown in Figure 1, for the purpose of enabling the operator to readily set the dating mechanism.

Each of the dating segments is provided with a printing hammer which is constructed the same as the printing hammers of the other printing segments, as shown in Figure 11. The printing hammer of each date printing segment is depressed by a pawl 252, shown in Figure 11, which, when free is moved rearward by a spring 253 so that its shoulder or hook engages with the lower shoulder 156 of the adjacent printing hammer and pulls the latter downwardly when the bar 151 is depressed. When the bar 151 is near the end of its downward movement, the pawl 252 is crowded with its hook from said lower shoulder by the upper shoulder 157 of the hammer engaging with the upper end of the pawl, thereby liberating the hammer and permitting the same to deliver a blow against the date-type carrier which is at the printing line, for producing an impression thereof.

Inasmuch as the printing of the date is not required frequently, the pawls of the month, day and year printing mechanism are held in an inoperative position when it is not desired to print the date, by means of a rock lever 254, as shown in Figures 11, 12, 14 and 21. This rock lever is provided on its upper arm with a cross bar 255 which is arranged transversely in rear of the several pawls of the dating mechanism. The rock lever 254 is turned by a spring 256, so as to move its upper arm forwardly and cause its cross bar to engage with the rear side of the pawls 207 and 252 of the dating mechanism and shift them into an inoperative position, out of engagement with the lever 247 and hammers 147 respectively. While the dating pawls are in this position, the same move up and down idly without operating the date-printing mechanism, but the pawls of the other printing segments are free to operate.

257 (Figs. 1 and 14) represents a shifting key whereby the pawls of the dating mechanism are released and permitted to move into their operative position for printing the date. This key is provided with a depending stem which is guided in the top and bottom of the key-board and which engages with its lower end against the upper arm of an elbow lever 258, as represented in Figure 14. The lower arm of this elbow lever is connected by a line or cord 259 with the lower arm of the lever 254. Upon depressing the shifting key 257 its respective elbow lever shifts the rock lever 254, so that the cross bar on its upper arm moves rearwardly from the dating pawls and permits the latter to assume an operative position.

*Platen mechanism*

The mechanism whereby the platen is supported and operated and the record sheet or other impression surface which receives the record is presented to the printing line, is constructed as follows:—

The frame of the carriage which supports the platen, paper and inking device consists of a transverse supporting sleeve 260 (Figs. 2, 14, 17 and 20) arranged in rear of the type-controlling mechanism and provided at opposite ends with two upwardly and forwardly projecting arms 261 and with two upwardly and rearwardly projecting arms 262. The supporting sleeve is arranged to slide transversely on a rod or track 263 which is secured with its ends to the sides of the main frame 1.

The platen is journaled in the upper ends of the front arms 261 of the paper carriage and is held in position at the printing line by means of a catch 264, Fig. 17, which engages with its front hooked end over a transverse rod 265 arranged below the platen and secured with its ends to the sides of the main frame, as represented in Figures 1, 2, 17 and 21. This catch is yieldingly connected with the paper carriage, so as to permit the platen to recede more or less from the printing types, for the purpose of adjusting the platen according to the thickness of the sheet or sheets of paper or other object which receives the impression and which is interposed between the platen and the printing types.

As shown in Figure 17, this yielding connection between the paper carriage and its retaining catch consists of a flat tension spring 266 which is secured with its lower end to the right-hand front arm 261 of the paper-carriage, and the retaining catch 264 is pivoted to the upper end of this spring so as to turn in a vertical plane. The upper end of the tension spring 266 is provided with a thumb piece 267, and the adjacent end of the retaining catch is provided with a similar thumb or finger piece 268. The paper carriage is swung forward until its front arms 261 strike the cross bar 265. The retaining catch, while moving forward with the carriage, rides with its inclined front end over the rod 265 and then engages with the front side of this bar, thereby holding the paper carriage in its operative position.

If the article which receives the record is above normal thickness, the platen cannot be moved forwardly sufficiently to engage the upper arms 261 with the cross bar 265. In order to hold the carriage in position while printing upon such an abnormally thick object, the upper end of the spring 266 is pressed forward by means of its finger piece 267 until the hook of the retaining catch engages with the cross bar 265. When it is desired to inspect the writing on the record sheet or object, the upper end of the paper-carriage may be swung backwardly from the printing mechanism by first pressing the tension spring 266 forwardly to ease the strain on the catch 264, and then turning this catch by means of its finger piece out of engagement with the cross bar 265, thereby leaving the carriage free to move rearwardly. The catch 264 is yieldingly held in engagement with the cross bar 265 by a spring 269 which is secured at one end to the main tension spring 266 and bears with its opposite end against the rear end of the catch.

When printing upon a sheet of paper, this sheet is fed forwardly underneath the platen and upwardly in front of the same, so that the sheet passes the printing line. The sheet is pressed against the underside of the platen, in rear of the printing line, by a transverse presser roller 270 (Figs. 2 and 14) arranged below the platen and journaled with its ends in the front arms 261 of the paper-carriage.

When it is desired to print upon a roll or web of paper, this roll is supported in rear of the platen and fed with its web around the platen in the same manner in which a sheet is fed. As shown in Figures 2, 14 and 17, an upper roll of paper is supported upon a divided spool consisting of two sections 271 which support opposite ends of the roll. 272 represents a horizontal supporting spindle which extends through the center of the upper roll of paper and through the sections of its supporting spool and which is supported at its ends in openings formed in the rear arms 262 of the paper carriage. This spindle is held against displacement in the paper carriage by a catch 273 pivoted to one of said arms 262 and engaging with a notch or groove 274 formed in said spindle, as represented in Figures 15 and 16.

The paper roll may be held against longitudinal displacement on the spindle by any suitable means, for instance by engaging one of its spool sections against one of the rear carriage arms and securing a clamping collar 275 to the spindle and bearing against the outer side of the other spool section, as represented in Figure 15. By moving the sections of the roll-supporting spool toward and from each other on the spindle the spool can be adjusted to suit different widths of paper.

When it is desired to print the record in duplicate, a duplicate roll or web of paper is fed simultaneously with the main sheet or web past the printing line. The duplicate roll or web of paper is preferably supported below the main roll on the sections 276 of a divided spool which is mounted on a spindle 277. This roll spindle is supported at its ends by means of hangers or hooks 278 which engage with the ends of the rear arms of the carriage, as shown in Figures 14, 15 and 17. The lower spool is held on the spindle by a collar 279 and the lower spindle is held in place on the hangers by a catch 280.

Paper guides 281 (Figs. 1, 2, 14, 17 and 21) represents two paper guides which engage against opposite sides of the webs or sheets between the rolls and the platen and prevent lateral displacement of the same. Each of these guides is adjustably secured to the adjacent front arms of the paper-carriage, preferably by means of a clamping screw 282 arranged on the adjacent carriage arm and engaging with a slot in the adjacent guide.

Platen feed or line spacing 283 (Figs. 1, 14, 19 and 21) represents a platen feed lever which is pivoted loosely on the left end of the platen shaft and which is provided on its rearwardly projecting arm with a pawl 284 which engages with a ratchet wheel 285 secured to the adjacent end of the platen. 286 represents an intermediate actuating lever which is pivoted on the lower part of the front carriage-arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring which connects the front arms of the ratchet lever and intermediate lever. The upper end of this spring is connected with the front arm of the ratchet lever a greater distance from the pivot of the latter than the distance between the connection of this spring with the intermediate lever and the pivot of the latter. By this connection of the spring 289, the leverage of the ratchet lever is greater than that of the intermediate lever, which causes this spring, when both of these levers are free, to turn these levers simultaneously in the direction for raising their rear arms, thereby moving the ratchet pawl upward for taking up a new tooth on the ratchet wheel.

The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 14.

The rocking motion of the intermediate lever is always the same, and in order to enable the same to turn the platen different distances, the rear arm of the intermediate lever is provided on its under side with a number of notches 292 which are arranged different distances from the fulcrum, and one or another of which is engaged by the lower end of the loop 288 on the connecting line 287. Upon engaging this loop with the notch of the intermediate lever nearest its axis, the ratchet pawl is shifted so that the platen is turned one line-space at a time; while upon shifting this loop into engagement with one of the outer notches of the intermediate lever, the platen will be turned forward by its ratchet mechanism a correspondingly greater distance by the operation of the machine.

The intermediate lever is turned in the direction for shifting the platen by a transverse bar 293 arranged below the front arm thereof, as represented in Figures 1, 2, 7, 14 and 21. This bar is supported upon the upper ends of two rock arms 294 which are mounted loosely at their lower ends on the cross bar 167. 295 (Fig. 14) represents a depending arm which is preferably formed in one piece with that one of the arms 294 arranged on the left hand side of the machine. This depending arm is provided with a nose which is arranged in rear of and in the path of the rocking frame 29.

During the last portion of the rearward movement of this rocking frame, it engages with the nose of the depending arm 295 and moves the same rearwardly, and the upper arms 294 connected therewith are moved forwardly, thereby causing the cross bar 293 to be carried upwardly and turn the intermediate lever in the direction for feeding the platen and paper forwardly. During the forward movement of the rocking frame 29, the rock arms 294 are turned backwardly, together with the intermediate lever and connecting parts, by the spring 289 preparatory to feeding the platen forward the next line space. As the line spacing of the record sheet by feeding the platen occurs after each item is printed and in the same operation in which said item is printed, the printed record is fed up into visible position at each operation of the machine.

If desired, the platen may be turned by hand when it is desired to adjust the paper, this being effected by releasing the pawl 284 from the ratchet wheel and then turning the platen by means of a button 296 secured to one end of the shaft, as shown in Figures 1, 19 and 21.

The cross bar 293 extends a sufficient distance transversely of the machine so as to engage with the front arm of the intermediate rock lever 286 in all the positions to which the paper carriage can be shifted transversely in the machine.

*Non-print renders paper feed inoperative*

In order to render the paper-feeding mechanism inoperative during the time that the type-controlling mechanism is out of gear, the operating mechanism of the paper feeding mechanism is so connected that the type-controlling and paper-feeding mechanisms are thrown into and out of gear simultaneously.

A simple means for this purpose consists of a link 297 (Figs. 14 and 21) connected at its front end with a depending arm 298 on the rock shaft 172 and provided at its rear end with a slot 299 which receives a pin 300 on the depending arm 295. Upon turning the rock shaft 172, by means of the key 176, in the direction for engaging its upper arm 171 with the hook 168 and disengaging the latter from the bar 169, the link 297 is moved rearwardly so that the front end of its slot engages with the pin of the depending arm 295 and holds the latter in its rearmost position. While the depending rock arm is so held it cannot move forwardly with the rocking frame 29 and consequently the ratchet pawl of the paper feed mechanism does not move backwardly for taking up a new tooth on the ratchet wheel.

Upon releasing the key 176 the rock shaft 172 turns in the direction for coupling the type-controlling mechanism with the rocking segments, the link 297 is moved forwardly, and the front end of its slot is carried forwardly a sufficient distance to permit the rock arm 295 to oscillate freely for actuating the paper-feeding mechanism.

*Horizontally movable carriage*

The paper-carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2 and 20. The adjusting sleeve is revolubly mounted on the supporting sleeve 260 between the carriage frame arms 261 and is provided with two or more longitudinal series of stop notches or graduations 303, 304. The notches in each series may be equidistant and the notches in one series are spaced different from the notches in the other series, as shown in Figure 20. The catch 302 is pivoted on the rod 167 and is yieldingly held in engagement with any one of the notches in the adjusting sleeve 301 by a spring 305. When it is is desired to shift the carriage intermittently short distances lengthwise of the platen for printing narrow columns, the adjusting sleeve is turned so as to present its closely spaced notches to the catch, and the latter is shifted from one of these notches to another as the printing progresses. When wider columns are to be printed the adjusting sleeve is turned so as to present correspondingly wider spaced notches to the catch. As shown in the drawings, only two series of adjusting notches are provded on the adjusting sleeve, but more series of notches may be provided if necessary.

If desired, sheet paper may be substituted for web paper to receive the record, without changing the parts of the machine, but the devices for holding the rolls of web paper may be removed from the machine when printing upon sheet paper.

*Inking means*

306, 307 (Figs. 1, 2, 14 and 19) represent two inking ribbons whereby the impression of the types at the printing line is produced simultaneously on the two sheets or webs of paper. The front or outer ribbon 306 is arranged in front of the outer or lower sheet and the rear or inner ribbon 307 is arranged between the front and rear sheets at the printing line, as represented in Figures 1, 2, 14 and 19. Each of these ink ribbons is wound with its opposite ends upon spools 308 and upon turning one of these spools in one direction, the ribbon will be wound thereon and unwound from the other spool and vice versa. The two spools on the same side of the machine are preferably arranged side by side and are journaled in bearings on the adjacent portion of the main frame, so that the spools of the front ribbon 306 are arranged adjacent to the inner sides of the spools of the rear or inner ribbon 307.

Each of the ink ribbon spools is provided on the front end of its shaft with a ratchet wheel 309, the ratchet wheels of the outer spools being arranged slightly forward of the ratchet wheels of the inner spools. 310 represents two ratchet levers whereby the ink ribbons are intermittently shifted lengthwise of the platen or transversely of the sheet. One of these levers is provided for each pair of spools and is provided at opposite ends with upwardly projecting hooks 311 which are adapted to engage with the ratchet wheels of its respective spools. 312 represents a transversely reciprocating bar which is guided with its ends in the side portions of the main frame and which supports and operates the ribbon-operating ratchet levers. The ribbon ratchet levers are arranged on opposite sides of the reciprocating bar 312 and the latter is provided on its central portion with a pin 313 which engages at its front end with a slot 314 in the central portion of the front ratchet lever, and engages at its rear end with a similar slot 314 in the central portion of the rear ratchet lever, as represented in Figures 1, 2, 19 and 46.

Each of the slots 314 consists of two branches which are united at their lower ends and diverge upwardly in the form of the letter V. 315 represents springs whereby the ribbon-shifting ratchet levers are yieldingly held in their operative position. Each of these springs is secured at its upper end to one of the shifting levers adjacent to the junction of its slot branches and with its other end to the adjacent part of the reciprocating bar. The tension of each of the springs 315 serves to draw the central part of its ribbon-shifting lever downwardly so that the upper end of one of its slot branches engages with the pivot pin 313 of the same.

As shown in Figures 1, 19 and 46, the left-hand branch of the V-shaped slot of the front ribbon-shifting lever engages with its upper end against the pivot pin 313, and the connection between the spring 315 and this lever is now arranged on the right-hand side of the pivot pin, which causes the right arm of this lever to be swung downwardly with its hook out of engagement with the opposing ratchet wheel, while its left arm is raised and its hook is yieldingly held in engagement with the adjacent ribbon ratchet wheel.

Upon reciprocating the bar 312, by the spring 316, lever 317 and connecting mechanism hereinafter described, when the parts are in this position, the left arm of the front ribbon-shifting lever is moved idly toward the left and its hook takes up a new tooth on the adjacent ratchet wheel and during the subsequent movement of the lever with the bar 312, toward the right, this hook turns the ratchet wheel and the spool connected therewith in the direction for winding the ribbon thereon. This operation of the front shifting lever is repeated during every reciprocating movement of the bar 312 thereby feeding the ribbon intermittently from the right hand spool to the left hand spool.

When the front ribbon has been wholly unwound from the right hand spool, the further movement of the ribbon toward the left is prevented by reason of the ribbon being connected with this spool. Upon moving the bar 312 toward the right while the right-hand end of the ribbon is thus held, the ribbon-shifting lever is prevented from moving toward the right with the bar, by reason of the hook of its left arm being in engagement with the ratchet wheel of the left-hand ribbon spool. When the ribbon shifting lever is thus arrested, the bar 312 moves toward the right independent of the lever and during this movement, the pivot pin 313 moves to the inner end of the left branch of the V slot and then outwardly in the right branch to the outer end thereof. By thus shifting the pivot pin 313 of the bar in the slot of the lever the connection between this lever and the spring 315 is carried toward the left side of the pivot pin, so that the relative position of the shifting lever and spring is reversed, as represented by dotted lines 310$^a$, 315$^a$, in Figure 46.

When this lever is so reversed, its right arm is turned with its hook into engagement with the ratchet wheel of the adjacent ribbon spool, and the left arm thereof is moved with its hook out of engagement with the ratchet wheel of the adjacent ribbon spool, whereby the movement of the ribbon is automatically reversed and the ribbon is caused to wind upon the right-hand spool and to unwind from the left hand spool. The ribbon continues to move toward the right until wholly unwound from the left-hand spool to which it is connected, when the pivot pin 313 of the ribbon-shifting lever is shifted back to the upper end of the left branch of the V slot, and the movement of the ribbon is again reversed in the same manner as before described.

The front and rear ribbon-shifting ratchet levers are reversed independently of each other and can feed their respective ribbons in opposite directions although they are both operated from the reciprocating bar. The latter is moved lengthwise in one direction, preferably toward the right, by a spring 316, as shown in Figures 1 and 19. The ribbon-shifting bar 312 is moved in the opposite direction by an elbow lever 317 which engages with its upper end against a lug or shoulder on the bar. 318 represents a rock arm which is secured to the rock lever 294, 295 of the paper-feed mechanism and which engages with the lower arm of the elbow lever 317, as shown in Figures 1, 14 and 19. When the rock lever 294, 295, turns in the direction for feeding the paper forward, the arm 318 turns the elbow lever 317 and moves the ribbon shifting bar 312 toward the left, and when the rock lever 294, 295 turns in the opposite direction, the spring 316 moves the bar 312 toward the right. When it is desired to print only one sheet or web of paper one of the ink ribbons may be removed, though not necessarily, as a single impression of the types may be made through both ribbons.

*Full-stroke mechanism*

In order to prevent the operator from making only a partial forward and backward stroke of the rocking frames 15 and 29, and thereby prevent erroneous registration, the following mechanism is provided:—

319 represents two detent pawls which are arranged over the rocking frames 15 and 29, respectively, and pivoted on a transverse rod 320, as represented in Figures 2, 7, 14 and 19. Each of these pawls is provided on its underside with two downwardly diverging detents 321 which are arranged substantially at right angles to each other and on its upper side with a V-shaped ridge 322. Upon turning the detent pawl in one direction, its front detent engages with the upper concentric edge or face of the adjacent rocking frame, while upon turning the pawl in the opposite direction, its rear detent engages with said edge. Each of the detent pawls is yieldingly held with either of its detents in engagement with the respective rocking frame by a presser arm 323 pivoted loosely on the transverse shaft 9 and provided at its rear end with a roller or projection which is held in engagement with the ridge of the adjacent pawl by a spring 324 connected with the arm 323 and bearing against the under side of the rod 320 (Fig. 2).

The concentric face or edge of each rocking frame is provided with a segmental series of notches 325 and undercut inclines 326 converging upwardly from the outer sides of the front and rear notches in the said concentric edge, as represented in Figures 2, 7, 9 and 14. In the rearmost positions of the rocking frames 15 and 29, the front detents of the detent pawls engage with the front inclines 326 of the rocking frames and turn the pawls so that their front detents are depressed into engagement with the foremost notches of the frames, while their rear detents are raised, as shown in Figure 2. The pawls are yieldingly held in this position during the forward movement of the frames by the presser arms 322 bearing against the inclined rear sides of the ridges on the pawls.

As the rocking frames move forward the front detents of the detent pawls engage with one pair of notches after another of the frames 15, 29, and at the end of the forward movement of the frames the rear inclines 326 thereof engage with the rear detents of the pawls and turn the same so that the front detents are raised and the rear detents are depressed into engagement with the rearmost notches 325 of the rocking frames. When the pawls are thus reversed by the rear inclines of the rocking frames, the ridge of each pawl is moved with its highest part in rear of the roller of the presser arm, which causes this arm to now hold the pawl in this position during the subsequent backward movement of its frame.

As the rocking frames move backwardly, the rear detents of the detent pawls engage successively with the notches of the rocking frames and when the latter reach the end of this backward movement, the front inclines 326 thereof engage with the front detents of the detent pawls and depress the same into engagement with the foremost notches of the frames and lift their rear detents into an inoperative position, as shown in Figure 1.

If the operator has moved the rocking frames forwardly more or less, so that one of the intermediate notches in each frame stands in front of its detent pawl and then attempts to move the rocking frames backwardly, before completing the forward movement of the frames, the front jaws of the pawls will engage with the intermediate notches immediately in front of the detent pawls and hold the frames against backward movement. After the rocking frames have completed their forward movement and the pawls have been reversed, each rocking frame is in like manner held against forward movement after the same has been moved backward sufficiently to carry one of its intermediate notches in rear of the rear jaw of its detent pawl. By this means the operator is compelled to complete a stroke of the rocking frames in one direction before reversing the movement of the frames, thereby avoiding displacement of the registering and recording mechanism.

*Keyboard mechanism*

The keys which have been depressed in the operation of adding or recording a number, word or other character are automatically locked in a depressed position until the adding or recording operation of the particular number, word or other character has been completed, and then the depressed keys are automatically released and permitted to be raised by their springs.

As shown in Figures 2, 7, 9, 14, 25-28 and 38-40, the keys are held in a depressed position by a number of locking plates 327, one of which is arranged lengthwise on the left side of the stems of each row of keys. Each of the locking plates is pivoted at its lower end to the top of the keyboard bottom, so as to swing transversely and is provided along its upper edge with a number of downwardly facing catches or shoulders 328 which are adapted to engage with upwardly facing locking shoulders 329 on the stems of the keys. Each of the keys is provided with a convex face below its locking shoulder, consisting of a lower rising portion 330 which inclines upwardly and laterally from the lower part of the keys toward the adjacent locking plate, and an upper receding portion 331 which inclines from the upper end of the rising portion to the outer end of the locking shoulder 329 of the stem, as shown in Figures 26, 27 and 40. Each locking plate is drawn yieldingly with its catches against the stems of the adjacent rows of keys by a spring 332, as shown in Figures 27 and 39. The locking catches of the locking plates bear against the key stems below the convex faces thereof when the keys are in an elevated position, as shown in Figure 25.

Upon depressing a key the convex face on its stem deflects the locking plate and when the key has been depressed fully the respective locking catch of the locking plate engages with the locking shoulder 329 of the stem of the depressed key, thereby retaining the parts which are operated by said key in a shifted position.

If the wrong key has been depressed and the operator subsequently depresses the right key the latter during the first part of its downward movement engages the lower or rising part 330 of its convex face with the adjacent locking catch of the locking plate and disengages the respective locking catch from the locking shoulder of the previously depressed key, thereby releasing the same, as represented in Figures 38 and 40. Upon continuing the depression of the second or correct key after the first or wrong key has been released, the receding or upper part 331 of the convex face of the correct key engages with the adjacent locking catch of the locking plate, thereby permitting the latter to approach the key stem and when the correct key has been fully depressed its locking shoulder is carried below the locking catch of the plate and is engaged thereby, whereby the correct key is locked in a depressed position, as represented in Figure 28. By this means any incorrectly depressed key is automatically released by the depression of the correct key and the latter is in turn automatically locked in a depressed position.

*Automatic key release*

333 (Figs. 25 and 26) represents a transversely movable releasing bar, whereby the keys of the main number registering devices are released. This bar is arranged transversely in rear of the rear ends of the locking plates of the main number keys and is guided with its ends in the frame of the machine, as shown in Figures 26 and 30. This bar is provided with a number of upwardly projecting releasing lugs or shoulders 334, one of which is adapted to engage with the right side of a pin or projection 335 on the rear end of each locking plate 327 of the main registering keys, as represented in Figures 7 and 25. Upon shifting the releasing bar 333 toward the left its releasing lugs move the main locking plates in the same direction thereby releasing any number keys which are held in a depressed position by the same. The main releasing bar 333 when free is shifted toward the right into its retracted position by the resilience of the springs which hold the main locking plates in their operative position.

The releasing bar 333 is shifted into its operative position by a releasing elbow lever 336 which turns on a pivot pin 337 and is connected by its upwardly projecting arm with the releasing bar 333 while its lower arm projects horizontally outward. 338 (Fig. 14) represents a releasing arm which is arranged lengthwise in the machine and extends transversely over the lower arm of the releasing elbow lever 336 and which is pivoted at its front end on a pin 339, as represented in Figures 14, 25 and 26. 340 (Fig. 14) represents a longitudinal releasing lever connected by an upright cord 341 with the rear end of the releasing arm 338 and projecting with its rear end into the path of the cross bar 25.

The main number keys are held in their depressed position until the rocking frames 15 and 29 have been moved forwardly sufficiently to operate the registering and recording mechanisms in accordance with the numbers of the depressed main keys and then the cross bar 25, during the last part of its forward movement with the rocking frames 15 and 29, engages with the releasing lever 340 and depresses the same. The releasing arm 338, during its downward movement with the releasing lever 340, engages with the lower arm of the elbow lever 336 and turns the latter so that its upper arm moves the main releasing bar 333 toward the left and moves the main locking plates out of engagement with the main number keys, thereby releasing the depressed main keys and permitting them to rise preparatory to setting the machine for registering and recording the next number.

The row of word keys 216 (Fig. 1) is arranged on the left-hand side of the main keys and the keys 401 of the auxiliary adding mechanism are arranged on the left hand side of the word keys. Each row of word and auxiliary number keys is provided with a locking mechanism similar to those of the rows of main keys.

The several shifting keys are arranged in a longitudinal row or column on the left side of the auxiliary keys, and the elbow levers operated thereby are arranged one behind the other, as represented in Figures 14, 25 and 26.

342 (Figs. 25, 26 and 29) represents an auxiliary releasing bar whereby the locking plates of the auxiliary keys are released. This bar is arranged transversely of the machine, in front of and parallel with the main releasing bar 333 and is adjustably connected therewith, so that the auxiliary releasing bar can be moved into an operative or inoperative position on the main releasing bar.

As shown in Figure 25, the auxiliary releasing bar is pivoted at its inner end to the main key-releasing bar by a horizontal pivot, and its outer end projects through an opening 343 in the frame as shown in Figure 29, which permits this bar to be manipulated by the operator from the outside of the frame. The auxiliary releasing bar is held in its raised or lowered position by means of two notches or recesses 344, 345, formed one above the other in this bar and each of which is adapted to be engaged with a pin or projection 346 on the main releasing bar, as shown in Figures 25 and 29, by the resilience of the auxiliary releasing bar which is sufficiently elastic for this purpose.

Upon raising the auxiliary releasing bar and engaging its lower recess with the pin 346, the releasing lugs 347 of this bar are carried up to the level of and on the right side of the pins on the rear ends of the locking plates of the auxiliary keys, so that upon moving the main releasing bar toward the left for releasing the main keys, the auxiliary releasing bar is simultaneously moved in the same direction and disengages the locking plates from the auxiliary keys. When it is desired to register or record an arithmetical progression of a number the auxiliary releasing bar is depressed, so that its lugs 347 are below the pins 335 of the locking plates of the auxiliary keys, this bar being held in this position by engaging its upper recess 344 with the pin 346. Upon now depressing the auxiliary keys of the desired number and then operating the registering and recording mechanism the number represented by the depressed keys will be registered and recorded, but these keys will not be released. While the depressed keys are thus held in a depressed position, the registering and recording mechanism can be repeatedly operated, during each of which operations the number represented by the depressed key is added over and over again, thereby registering and recording the arithmetical progression of this number.

The two columns or rows of word and shifting keys are each provided with a locking mechanism similar to those of the main and auxiliary number keys, but the locking plates of these keys are disengaged from the keystems by a separate releasing mechanism so as to permit the main and auxiliary number keys to be released without releasing the word and shifting keys.

As shown in Figures 25 and 26, the release of the word and shifting keys is effected by a supplemental releasing bar 348 having lugs 349 which engage with the pins 335 on the rear end of the locking plates of the word and shifting keys and which is guided at its outer end in the main frame. The inner end of the supplemental releasing bar is pivoted to the upper arm of a releasing elbow lever 350. This lever is pivoted on the pin 337 and its lower arm projects toward the right and underneath the releasing arm 338 adjacent to the rear side of the lower arm of the releasing elbow lever 336.

When both lower arms of the releasing elbow levers 336 and 350 are arranged underneath the releasing arm 338, the depression of the latter by the rocking frames causes the supplemental releasing bar to be moved toward the left so that its lugs disengage the locking plates of the word and shifting keys from their respective stems at the same time that the main and auxiliary releasing bars disengage the locking plates of the main and auxiliary number keys from that respective stems, thereby releasing all of the keys simultaneously after the registering and recording of the words and numbers has been effected.

*Repeat key*

For the purpose of permitting all the words and numbers represented by the depressed keys to be added and recorded repeatedly, the releasing elbow levers 336, 350 are shifted toward the right and their lower arms are moved from underneath the releasing arm 338 so that the depression of the lever 340 by the rocking frames will not affect the releasing elbow levers 336, 350, thereby retaining the keys in their shifted position and permitting of producing repeated additions and impressions of the types which correspond to the depressed keys. The releasing elbow levers 336, 350 are moved into operative and inoperative position by means of a supporting elbow lever 351, as shown in Figures 14, 25 and 26. This lever is pivoted on a stationary bracket 352 and its upper arm carries the pin 337 on which the releasing elbow levers 336, 350 are pivoted. 353 represents an actuating rock lever which engages with its rear arm against the underside of the lower arm of the supporting elbow lever 351.

354 (Fig. 14) represents a repeating shifting key having a depending stem which is guided in the top and bottom of the keyboard and which engages with its lower end against the front arm of the actuating rock lever 353. Upon depressing the repeating key, the supporting elbow lever 351 is turned by the actuating lever in the direction for moving the releasing elbow levers 336, 350, so that their lower arms clear the releasing arm 338 and will not be effected by the depression of the latter.

Upon releasing the repeating key the supporting elbow lever 353 is returned to its normal position by a spring 355, shown in Figures 14 and 25, and the releasing elbow levers 336, 350 are shifted into an operative position with their lower arms projecting underneath the releasing arms 338. The releasing elbow lever 350 is turned in the direction for moving the supplemental releasing bar 348 into its retracted position by a spring 356 which is secured to the supporting elbow lever 351. The movement of the elbow lever 350 in this direction is limited by a stop 357 on the supporting elbow lever 351, as shown in Figures 25 and 26.

When it is desired to record the total or subtotal of the added numbers or when it is desired to return the dials to zero, the number keys must all be released in order to permit the key levers to assume the position corresponding to the dials preparatory to recording the total registering by the same. This is effected by an intermediate elbow lever 358 (Figs. 14, 25 and 26) which is pivoted on the pin 339 and which projects rearwardly over the lower arm of the releasing elbow lever 336 but does not project over the lower arm of the releasing elbow lever 350. 359 represents a longitudinal connecting bar connected at its rear end to the lower arm of the intermediate elbow lever 358 and provided with longitudinal slots 360 which receive pins or projections 361 on the lower arms of the elbow levers 80 and 85 and which are operated by the total-print and clear keys 84 and 87, as represented in Figure 14. The pins 361 of the total and zero elbow levers engage normally with the front ends of their respective slots in the connecting bar 359 which causes the latter to be shifted forward by any one of the respective keys without disturbing the others. Upon moving the connecting bar 359 forwardly by the depression of any one of the total or zero keys, the intermediate elbow lever 358 is turned in the direction for depressing its upper arm into engagement with the lower arm of the releasing elbow lever 336, thereby releasing all of the number keys. The depressed word keys and the shifting keys remain depressed until the rocking frames 15 and 29 have completed their forward movement and the registering and recording of the totals have been effected. The locking mechanism of the shifting keys is so constructed that the zero key 87 cannot be held down by the adjacent locking plate, as shown in Figure 14, because the depression of the same is necessary only during the backward movement of the rocking frames.

*Special key-lock*

For the purpose of locking the consecutive numbering key 230, non-printing key 176 or repeating key 354 in a depressed position when it is desired to continue the use of these keys and the mechanism controlled thereby for some time, each of these keys is provided with a movable locking block 362 (Figs. 14, 27 and 28). Each of these blocks is arranged below the top of the key-board, adjacent to its respective shifting key, and is provided with a thumb piece 363 which is guided in a slot 364 in the top of the key-board and projects above the same. Upon retracting the locking block from above the stop shoulder of the shifting key, as shown in Figure 27, the key can rise to its uppermost position. Upon depressing this key and then shifting the locking block so that it is arranged between the stop shoulder 44 of the key and the top of the keyboard, as shown in Figure 28 the key is held in depressed position.

*Key interlocking mechanism*

In order to produce a correct register and record of the numbers and words, each column of number and word keys is provided with a locking mechanism which prevents more than one key in each of these columns from being held in a depressed position at the same time. This locking mechanism is best shown in Figures 25, 27, 37, 38 and 44, and is constructed as follows:

365 represents a number of tumblers or blocks arranged in longitudinal rows on the bottom of the key-board, each row being adjacent to the right-hand side of the stems of a respective row of number or word keys. These tumblers are capable of a longitudinal movement with reference to the column of keys and each set of tumblers, is guided on a rod 366 which is supported on the key-board bottom. Each of the tumblers is provided with a convex upper side which preferably slopes or inclines from its highest central part toward the front and rear sides of the tumbler in the form of an inverted letter V. The longitudinal movement of the tumblers is limited by front and rear stops 367, 368 which are engaged by the front and rear tumblers and which also serve to support the guide rod 366 above the bottom 42, as shown in Figure 37. The stem of each number and word key is provided on the side opposite to its locking plate 327 with a follower or spreading head 369. The heads of the intermediate keys have a convex underside which preferably inclines from its lowest central part to the front and rear sides of the head in the form of the letter V.

Each of the spreading heads, except the foremost and rearmost is arranged over the space between two tumblers. The heads of the foremost and rearmost keys are arranged in front and in rear of the foremost and rearmost tumblers respectively, and these heads are inclined only on the side facing the adjacent tumbler, as shown in Figure 37.

Upon depressing a key in any one of the columns of number or word keys, the spreading head of this key engages with the tumblers on opposite sides thereof and crowds the tumblers in front of the head forwardly and those in rear of the head rearwardly. When the shifting head has been depressed to its fullest extent, the foremost tumbler bears against the front stop 367 and the rearmost tumbler bears against the rear stop 368, and the slack between the several tumblers is fully taken up.

In Figure 37, key number 5 is shown depressed fully and the slack between the tumblers is taken up, in which position of the key its shoulder 329 is engaged by the catch of the adjacent locking plate and is prevented from rising. If key number 5 was depressed erroneously and the correct key, for instance number 3 is subsequently depressed, this correct key moves downwardly idly until it engages or nearly engages the adjacent tumbler and when the correct key reaches this position, its releasing cam or convex face engages with the adjacent locking plate and shifts the same out of engagement with the locking shoulder 329 of the depressed key number 5, as shown in Figure 38, thereby releasing this key and permitting the same to rise. During the continued downward movement of the correct key number 3, the spreading head of the same moves downwardly between the adjacent tumblers and shifts the same so as to take up the slack between them. When the correct key reaches the end of its downward movement, the same is locked in this position by the adjacent locking plate in the same manner in which key number 5 was previously locked.

The slack between the several tumblers is only sufficient to permit of the full depression of one key at a time and the tumblers are so constructed that when two keys are depressed simultaneously these keys are arrested in their downward movement before their locking shoulders are engaged by the locking plate. By this means any one key in a column may be depressed and locked in its depressed position, and if an incorrect key has been depressed, the same is released by the subsequent depression of the correct key, and the correct key is in turn locked in a depressed position, but the locking of two keys at the same time in a depressed position is prevented.

It is sometimes desirable to depress several of the shifting keys simultaneously and lock the same in a depressed position. In the machine as organized no more than three shifting keys require to be depressed and locked at the same time. In order to prevent more than three shifting keys from being locked in a depressed position at the same time, the following mechanism is provided:—

370 represents a number of tumblers which are arranged in a longitudinal row below the stems of the shifting keys and each of which is secured to the lower end of a flat spring 371 depending from the underside of a supporting bar 372. Each of these tumblers has the form of an upwardly tapering wedge, as shown in Figure 39, and is capable of swinging lengthwise of the column of shifting keys but is held against transverse movement by arranging the depending springs so that their flat sides extend transversely. 373, 374 represent front and rear stops arranged in front and in rear of the foremost and rearmost tumblers 370. 375 represents a number of followers or spreading heads one of which is secured by a flat spring 376 to the lower end of the stem of each shifting key. Each of these spreading heads is preferably cylindrical in form and is capable of swinging lengthwise of the column of shifting keys, but is held against lateral movement owing to the transverse arrangement of the flat supporting spring. Upon depressing any one of the shifting keys its spreading head moves downward between the adjacent tumblers and shifts the same forward and backward from opposite sides of the spreading head. The front and rear stops 373, 374 are so arranged that the slack between the several tumblers is sufficient to allow of full depression of three shifting keys.

As shown in Figure 39, three keys are depressed fully and their followers or spreading heads have been moved between the adjacent tumblers so that the several tumblers bear against each other and against the depressed followers or heads and against the front and rear stops 373, 374, thereby taking up all of the slack between the tumblers. In order to lock these three keys in a depressed position, the same must be depressed simultaneously. If an additional key, for instance the non-printing key 176, is depressed, as shown in Figures 39 and 40, this fourth key is free to move downwardly without disturbing the previously depressed keys until its follower or head engages or nearly engages with the adjacent tumblers and when this fourth key reaches this position its releasing cam engages with the adjacent locking plate 327 and deflects the same, as shown in Figure 40, thereby disengaging the plate from all of the previously depressed keys and causing the same to rise simultaneously. It will thus be seen that by this means three keys can be locked in a depressed position and if an error has been made in the depression of one or more of the keys, the subsequent depression of the correct key or group of three keys permits the release of the previously depressed incorrect keys and the locking of the correct keys in a depressed position. If it is desired to permit of locking more or less than three shifting keys in a depressed position, the slack space between the several tumblers must be adjusted accordingly.

Instead of supporting the tumblers of the shifting keys from the top, as shown in Figures 39 and 40, the same may be supported by flat springs 377 from the bottom, as shown in Figure 41. If desired the tumblers and followers of the shifting keys may have the form of spheres, as shown at 378, 379, in Figure 41.

Keys of different aspect

In order to enable the operator to distinguish the figures or numbers readily on the key-board and thereby enable the same to be manipulated more rapidly, the columns of main figure or number keys are arranged in groups and each group is distinguished by color or otherwise from the adjacent groups.

As shown in Figure 1, the keys in the first three columns, representing figures to the right of the decimal point or less than a whole number, are indicated in black on a white background; the second three columns of figures from the left of the decimal point to the first pointing off place, representing the whole numbers less than thousands, are indicated in white on a black background; and the third three columns of figures from the first pointing off place to the second pointing off place representing the whole numbers between hundreds and millions, are indicated in black on a white background. The words and characters on the word-keys and shifting-keys are also indicated in white on a black background to distinguish them readily from the intermediate auxiliary numbers keys which are indicated in black on a white background.

Operation

Assuming that the item "Dec. 14, 1899, 28 Rebate 34061.97 5/8" is to be registered and recorded on a bill, the operation, briefly stated, is as follows:—

The operator first adjusts the date-printing segments into the proper position by means of the catches 250 and then depresses the dating key 257. All the other shifting keys are released and permitted to rise, whereby all of the devices controlled by these keys are thrown out of gear excepting the recording mechanism which is thrown into gear by the rising of its shifting key 176.

The slide 223 is then shifted toward the left into its inoperative position so as to permit the auxiliary registering and recording mechanism to add numbers after which the keys 2 and 8 in the tens and units columns of the auxiliary keys are depressed. The word-key representing "Rebate" in the column of word-keys is next depressed and then the main keys representing the numbers 34061.97 and the fraction 5/8 are depressed in their proper columns. The depression of these keys causes the key levers to be shifted so as to move the proper differential stops into the path of the controlling arms, and the detector dials 238 are turned so as to indicate the numbers of characters of the keys which have been depressed, thereby enabling the operator to correct any error, if a wrong key has been depressed, before registering and recording the item.

If the item appears correctly on the detector dials the operator moves the handle 21 forwardly and backwardly once. During the first part of the forward movement of the handle, the main gear segments are moved forward into engagement with the dial pinions. During the next part of the forward movement of the handle the main gear segments which correspond with the depressed keys are moved downward a distance corresponding with the numbers or characters of the depressed keys, at which point the key levers arrest the main gear segments through the medium of the controlling arms. While the main gear segments are effecting their registering movement, the hammers of the recording mechanism are retracted as represented in Figure 7. After the gear segments have completed their downward or registering movement the hammers are released and produce an impression of the types at the printing line. During the last part of the forward movement of the handle 21, the main gear segments are retracted out of engagement from the dial pinions and are elevated, while so retracted, to their initial position during the subsequent backward movement of the handle. During the last portion of the forward movement of the operating handle the depressed keys have been released preparatory to being again depressed for registering and recording another item.

The addition of further items of this bill is repeated in the same manner. If all the items have the same date, the dating key 257 may be released after recording the first item, whereby the date will be only printed once at the head of the items. If the items bear different dates the dating segments must be adjusted accordingly. After all the items of a bill have been registered and recorded, the operator depresses the total printing key 84 and then moves the handle 21 forwardly, whereby the total is recorded. While the handle is in its forward position, the operator depresses the zero key 87, thereby causing the gear segments to be moved forwardly into engagement with the dial pinions and turn them back to zero during the subsequent backward movement of the handle.

If it is desired to record the main numbers in duplicate the operator shifts the bar 191 so as to permit the duplicate hammer pawls to cause their hammers to actuate the duplicate printing types and thereby produce a separate record at the printing line, of the numbers recorded by the main printing types.

The vertical ruling between the dollars and cents numbers is effected automatically, and if a cross rule is desired at the foot of a column of numbers, the operator depresses the cross ruling key 198.

When it is desired to print the same item or numbers two or more times in succession, the depression of the repeating key 354 shifts the mechanism to produce this result.

By depressing the non-printing key 176 the recording mechanism is thrown out of gear and no record is produced of the numbers. When it is desired to consecutively count the number of items in a bill which has been added on the main registering mechanism, the slide 223 is shifted toward the right so that its stops and finger intercept the lugs and latches of the adjacent controlling arms and segments, whereby the auxiliary registering mechanism is caused to operate as a counting machine instead of a differential adding or registering machine. This is especially desirable in banks where the number of vouchers which are returned to a customer are required to be counted, and the amounts on the faces of the vouchers are required to be added.

If it is desired to throw the printing mechanism of the auxiliary register out of action and still permit the recording mechanism of the main register to operate, the thumb piece 234 is moved rearwardly.

I claim:

1. In a calculating machine, the combination of a plurality of sets of accumulators, key-mechanism comprising settable keys for determining items to be accumulated upon any of said sets of accumulators; operating mechanism for effecting accumulation upon said sets of accumulators under the control of said keys, printing mechanism operable for printing said items under control of said key-mechanism; and a paper carriage movable transversely of said printing mechanism for shifting a record sheet to receive printing by said printing mechanism in different columnar positions on said record sheet.

2. In a calculating machine, the combination of a plurality of sets of accumulators; printing mechanism for printing the items accumulated by each of said sets of accumulators, and comprising separate sets of types one set for each of a plurality of said sets of accumulators; a set of duplicate-printing types automatically operable to print a duplicate of the items printed by one of said separate sets of types; and universal operating mechanism for operating said sets of accumulators and said separate sets of types and said duplicate-printing types.

3. In a calculating machine, the combination of a plurality of sets of accumulators; printing mechanism for printing the items and totals accumulated by each of said sets of accumulators, and comprising separate sets of types one set for each of a plurality of said sets of accumulators; a set of duplicate-printing types automatically operable to print duplicates of the items and totals printed by one of said separate sets of types; manipulative means for causing each of a plurality of said sets of types and said set of duplicate-printing types to print the total accumulated by the respective set of accumulators and under control of said set of accumulators; and universal operating means for operating said sets of accumulators and said separate sets of types and said duplicate-printing types.

4. In a calculating machine, the combination of a plurality of sets of accumulators; printing mechanism for printing the items and totals accumulated by each of said sets of accumulators, and comprising separate sets of types one set for each of a plurality of said sets of accumulators; a set of duplicate-printing types automatically operable to print duplicates of the items and totals printed by one of said separate sets of types; manipulative means for causing each of a plurality of said sets of types and said set of duplicate-printing types to print the total accumulated by the respective set of accumulators and under control of said set of accumulators; universal operating means for operating said sets of accumulators and said separate sets of types and said duplicate-printing types; and manipulative means for rendering said universal operating means ineffective with relation to said duplicate-printing types.

5. In a calculating machine, the combination with two totalizers, actuating devices therefor, multiplying devices, type which are positioned by said actuating devices to print side by side the products resulting from the operation of said multiplying devices, and word-printing mechanism whose type are arranged to print by the side of said first-mentioned type; substantially as described.

6. In a calculating machine, the combination of a set of accumulators operable to accumulate items, a plurality of numeral types operable to print on a record sheet the items accumulated on said accumulators, a plurality of word-types operable for printing on said record sheet, a plurality of date printing types operable to print on said record sheet, and common operating mechanism for operating said accumulators and all of said types, the construction and arrangement being such that said numeral types, said word types and said date printing types may be optionally operated by said operating mechanism.

7. In a calculating machine, the combination of a plurality of sets of accumulators each set operable to accumulate items different from and independently of another of said sets of accumulators, a plurality of manipulative members for determining the items to be accumulated on said sets of accumulators, number printing mechanism operable for printing the items accumulated on said sets of accumulators, a plurality of dating types for printing dates in juxtaposition to the items printed by said number printing mechanism, a plurality of manipulative members for determining the date that shall be printed, a plurality of word types operable for printing words in juxtaposition to items printed by said number printing mechanism, a plurality of manipulative members for determining which of said word types shall print, and operating mechanism for operating said accumulators and said number printing types and said date printing types and said word types according to the control of the related manipulative members.

8. In a calculating machine, the combination of a set of accumulators operable to accumulate items into totals, a plurality of numeral types operable for printing items accumulated on said accumulators, a plurality of keys for determining said items, a plurality of dating types operable to print dates in juxtaposition to matter printed by said numeral types, a plurality of manipulative members for controlling which of said dating types shall print, universal operating mechanism for causing said accumulators to accumulate and said numeral types to print the items determined by said keys and operable for effecting printing by said numeral types of the total accumulated by said accumulators and under control of said accumulators and for causing said dating types to print according to the control of said manipulative members, a plurality of special types operable for effecting printing of matter other than numerals in juxtaposition to matter printed by said numeral types, and a plurality of manipulative members for controlling printing by said special types.

9. In a calculating machine, the combination of a set of accumulators operable to accumulate items into totals; a plurality of sets of numeral types, each of said sets operable to print items accumulated by said sets of accumulators whereby said plurality of sets of types may concomitantly produce duplicate records of such items; a plurality of keys for determining said items; a plurality of special types operable for effecting printing of matter other than numerals in juxtaposition to matter printed by said numeral types; a plurality of manipulative members for controlling printing by said special types; a plurality of dating types operable to print dates in juxtaposition to matter printed by said numeral types, a plurality of manipulative members for controlling which of said dating types shall print, and universal operating mechanism for causing said accumulators to accumulate and said numeral types to print the items determined by said keys and operable for effecting printing by said numeral types of the total accumulated by said accumulators and under control of said accumulators, and for causing said special types and said dating types to print according to the control of said manipulative members.

10. The combination with adding mechanism, and recording mechanism whereby said adding mechanism may be operated to add in separate parts thereof a plurality of numbers simultaneously recorded by said recording mechanism, said recording mechanism being operable effectively to record any total or totals represented in said adding mechanism, of means for holding one part of the aforesaid adding mechanism in stationary position with a total represented therein while a separate total in another part of the same adding mechanism is being recorded.

11. In a device of the kind described, a plurality of series of keys, a shaft, and a plurality of substantially independent oscillating indicators for each series, mounted on said shaft, in combination with intermediate mechanism between the keys and the indicators, whereby the movement of the keys is transmitted to and actuates the indicators.

12. In a calculating machine, the combination of accumulating mechanism, printing mechanism co-operative therewith; a plurality of number keys for controlling items accumulated by said accumulating mechanism and printed by said printing mechanism; universal operating mechanism for operating said accumulating and printing mechanisms according to the control of said number keys; two sets of controlling keys for controlling functioning of said mechanisms other than that controlled by said number keys; and manipulative means for rendering a key of one of said sets of controlling keys ineffective with relation to a function controlled by it without rendering a key of the other of said sets of controlling keys ineffective with relation to a function controlled by the last said key.

13. In an adding machine having printing and adding mechanism and normally arranged to both print and add, and means for eliminating the adding function of the machine at the will of the operator, with provisions for partially eliminating the printing function.

14. In an adding machine having printing and adding mechanism and normally arranged to both print and add, means for eliminating the adding function of the machine at the will of the operator, and mechanism for rendering inoperative the printing mechanism corresponding to a predetermined number of the denominations; substantially as described.

15. In an adding machine of the multiple key bank type, the combination, with the adding and printing mechanisms thereof, of means for rendering the same inoperative as to a predetermined number of the rows or banks of keys and also eliminating the adding function of the machine as to the remainder of the rows of keys; substantially as described.

16. In an adding machine, the combination of printing and adding mechanism, and means for eliminating the adding function of the mechanism at the will of the operator and also rendering a portion of said mechanism inoperative as to its printing function; substantially as described.

17. In an adding machine, the combination of printing and adding mechanism, and means for eliminating the adding function of the mechanism at the will of the operator and simultaneously rendering a portion of said mechanism inoperative as to its printing function; substantially as described.

18. In an adding machine, in combination, multiple order adding mechanism and percussive digital type-impression mechanism and optionally operable means adapted selectively and at the will of the operator to prevent the percussive action of the digital type-impression mechanism in a varying plurality of orders.

19. The combination of a quantity register, a value register associated therewith, said registers being assigned to a given account, actuating mechanism for each register, a keyboard for selecting both registers for operation by a single set-up, and a keyboard for controlling the operation of each mechanism.

20. In a calculating machine, the combination of a set of accumulators operable to accumulate items, a plurality of numeral types operable to print on a record sheet the items accumulated on said accumulators, a plurality of word types operable for printing on said record sheet, a plurality of date printing types operable to print on said record sheet, and common operating mechanism for optionally operating said accumulators and all of said types.

21. The combination of a series of keys, two series of totalizers, a plurality of printing devices including independently operable type operatively connected with said keys, means for positioning corresponding type of said plurality of printing devices according to the keys operated, means to operate either series of accumulators, mechanical means comprising a print receiving platen and independently operable hammers for producing substantially uniform impressions from said type as positioned in a plurality of separate places, and means for causing the accumulation of the amounts printed, substantially as described.

WILLIAM S. GUBELMANN.